United States Patent
Heitmann et al.

(10) Patent No.: US 8,519,248 B2
(45) Date of Patent: Aug. 27, 2013

(54) VISUAL RESPONSES TO A PHYSICAL INPUT IN A MEDIA APPLICATION

(75) Inventors: Kerstin Heitmann, Hamburg (DE); Robert Chin, San Francisco, CA (US); Jan-Hinnerk Helms, Hamburg (DE); Sascha Hoehne, Oststeinbek (DE)

(73) Assignee: Apple Inc., Cupertino, CA (US)

( * ) Notice: Subject to any disclaimer, the term of this patent is extended or adjusted under 35 U.S.C. 154(b) by 1499 days.

(21) Appl. No.: 12/123,536

(22) Filed: May 20, 2008

(65) Prior Publication Data

US 2009/0066639 A1    Mar. 12, 2009

Related U.S. Application Data

(60) Provisional application No. 60/993,347, filed on Sep. 11, 2007.

(51) Int. Cl.
*G01P 3/00* (2006.01)
*G10H 1/02* (2006.01)

(52) U.S. Cl.
USPC ............................................. 84/626; 715/727

(58) Field of Classification Search
USPC ................... 84/626, 645; 715/727
See application file for complete search history.

(56) References Cited

U.S. PATENT DOCUMENTS

| | | | |
|---|---|---|---|
| 5,777,254 A | 7/1998 | Fay et al. | |
| 5,783,767 A | 7/1998 | Shinsky | |
| 6,057,503 A | 5/2000 | Shinsky | |
| 6,156,965 A | 12/2000 | Shinsky | |
| 6,156,966 A | 12/2000 | Shinsky | |
| 6,281,885 B1* | 8/2001 | Eastty et al. | 345/173 |
| 6,762,358 B2 | 7/2004 | Iguchi et al. | |
| 7,078,608 B2* | 7/2006 | Aiso et al. | 84/625 |
| 7,096,186 B2 | 8/2006 | Funaki | |
| 7,373,210 B2 | 5/2008 | Pennock et al. | |
| 7,453,039 B2 | 11/2008 | Ramstein | |
| 7,504,574 B2 | 3/2009 | Okamoto et al. | |
| 7,626,109 B2 | 12/2009 | Katou | |
| 7,825,322 B1* | 11/2010 | Classen et al. | 84/622 |
| 7,958,457 B1* | 6/2011 | Brandenberg et al. | 715/789 |
| 2002/0107592 A1 | 8/2002 | Craig | |
| 2002/0108484 A1 | 8/2002 | Arnold et al. | |
| 2002/0130844 A1 | 9/2002 | Natoli | |
| 2003/0131714 A1 | 7/2003 | Iguchi et al. | |
| 2006/0282562 A1 | 12/2006 | Aiso et al. | |
| 2007/0058823 A1 | 3/2007 | Terada | |
| 2007/0061729 A1* | 3/2007 | Terada | 715/727 |
| 2007/0089590 A1 | 4/2007 | Katou | |
| 2008/0184872 A1 | 8/2008 | Hunt et al. | |

(Continued)

*Primary Examiner* — Jeffrey Donels
(74) *Attorney, Agent, or Firm* — Fletcher Yoder PC

(57) ABSTRACT

A media application for providing outputs (e.g., audio outputs) in response to inputs received from an input device is provided. The media application may connect input mechanisms of an input device with parameters of channel strips (e.g., which may define output sounds) using an intermediate screen object. The media application may first assign an input mechanism to a screen object, and separately map a screen object to a channel strip parameter. The media application may map a screen object to several channel strips simultaneously such that, based on the value of the screen object, the volume of each of the several channel strips changes. The media application may provide a graphical representation of available channel strips using layers. As the media application accesses a channel strip, the appearance of the portion of the layer associated with the channel strip may change. The media application may also allow the patches, which may include several channel strips, to survive after a new patch is selected instead.

25 Claims, 24 Drawing Sheets

(56) References Cited

U.S. PATENT DOCUMENTS

| | | |
|---|---|---|
| 2008/0215763 A1 | 9/2008 | Adam et al. |
| 2009/0064850 A1 | 3/2009 | Lengeling |
| 2009/0067641 A1 | 3/2009 | Lengeling |
| 2011/0033067 A1 | 2/2011 | Okabayashi |
| 2012/0036552 A1* | 2/2012 | Dare et al. ............. 726/1 |
| 2012/0124470 A1* | 5/2012 | West et al. ............. 715/702 |

* cited by examiner

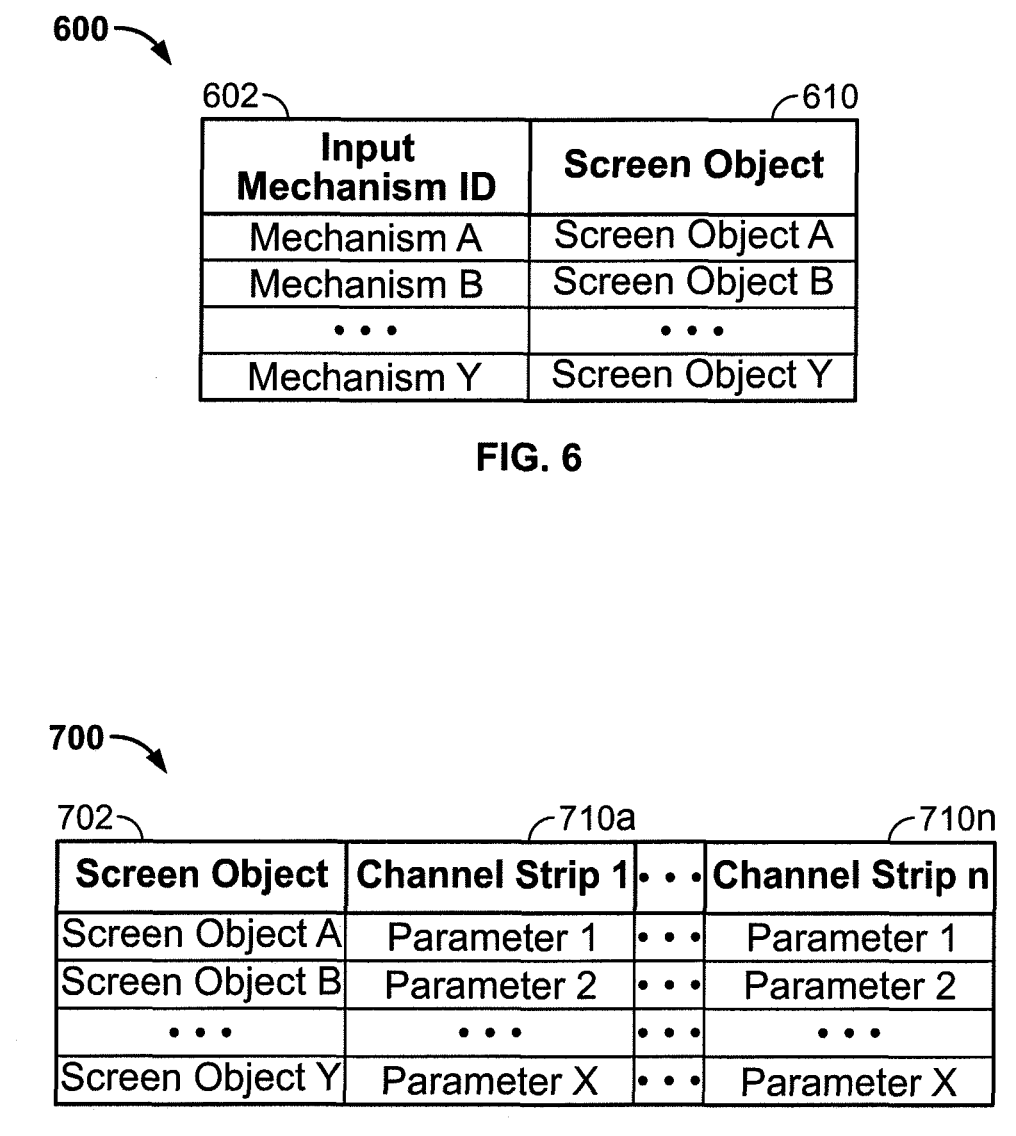

600 ⇘

| Input Mechanism ID | Screen Object |
|---|---|
| Mechanism A | Screen Object A |
| Mechanism B | Screen Object B |
| ... | ... |
| Mechanism Y | Screen Object Y |

| Screen Object | Channel Strip 1 | ... | Channel Strip n |
|---|---|---|---|
| Screen Object A | Parameter 1 | ... | Parameter 1 |
| Screen Object B | Parameter 2 | ... | Parameter 2 |
| ... | ... | ... | ... |
| Screen Object Y | Parameter X | ... | Parameter X |

FIG. 7

VISUAL RESPONSES TO A PHYSICAL INPUT IN A MEDIA APPLICATION

REFERENCE TO RELATED APPLICATIONS

This application claims the benefit of prior filed U.S. Provisional Patent Application No. 60/993,347, filed Sep. 11, 2007, which is incorporated by reference herein in its entirety.

BACKGROUND OF THE INVENTION

This invention is directed to a media application for providing media outputs in response to receiving inputs from an input device.

Using some media applications, user may provide inputs using MIDI input devices (e.g., an electric keyboard or a drum pad) that may be modified before being output by the media application. For example, the media application may include effects for changing the instrument of the output sound, distorting the sound, causing the sound to survive after the user releases a key, or any other suitable effect. The media applications, however may include complex user interfaces that may limit a user's producing experience.

SUMMARY OF THE INVENTION

Thus, a media application for enhancing a user's audio producing experience is provided.

In some embodiments, the media application may assign physical controls of the input device, for example input mechanisms of the input device to screen objects. The screen objects may represent knobs, rollers, sliders, faders, buttons or other input mechanisms that the user may use to provide inputs to the media application. The media application may also map screen objects to parameters of channel strips that define the attributes of sound output by the media application. When the user provides an input using an input mechanism, the media application may first cause the screen object assigned to the input mechanism to move in response to the input, and subsequently cause the parameter mapped to the screen object to a change in response to the change in value of the screen object.

When a user changes input devices, the media application may maintain the mappings between the screen objects and parameters, but lose the assignments between the input mechanisms of the input device and the screen objects. To couple the input mechanisms of the new input device to the channel strip parameters, the user may simply re-assign the input mechanisms of the new input device to the screen objects.

In some embodiments, the media application may simulate several instruments using a single instrument (e.g., a single input device that is an instrument). The media application may assign several channel strips, each defining different instruments, to a layer. Each channel strip may be associated with a key range of the input device such that in response to receiving an input that falls within a channel strip's key range, the channel strip is used to output a sound. To expand the key range of each channel strip, the media application may define a floating split between channel strips. In response to receiving an input that exceeds the initial key range of a channel strip, the media application may selectively increase the channel strip so that the output is provided using the channel strip. The media application may include any suitable criteria for selectively increasing the key range of a channel strip, including for example parameters set by the user, the previous inputs received, the time lapsed since the previous input, the jump between the previous input and the current input (e.g., more than one octave), or any other suitable criteria.

In some embodiments, the media application may mix different levels of different sounds in response to an input from an input mechanism. The media application may assign levels (e.g., volume) of several channel strips with different values of an input mechanism. For example, the media application may provide a graph of channel strip curves when the position on one axis of the chart is determined by the value of an input mechanism (e.g., a foot pedal). In response to determining the current value of the input mechanism, the media application may determine the associated level at which each channel strip is output (e.g., based on the position on each channel strip curve) and provide an output of the channel strips and the determined values. In some embodiments, the user may fade out a first channel strip and fade in a second strip by changing the value of the input mechanism.

In some embodiments, the media application may provide visual responses to inputs received from the input device. The media application may display several layers, each representing one or more channel strips. When the user provides an input to access the channel strip of a layer, the media application may change the appearance of the accessed channel strip (or of the entire accessed layer) to indicate to the user the channel strip currently being used to output a sound. In some embodiments, if several channel strips or layers are used, the media application may change the appearance of the several channel strips or layers. The amount by which the appearance of a layer changes may be determined using any suitable approach, including for example based on the strength or velocity of the user's input.

In some embodiments, the media application may direct a patch that includes several channel strips to survive when a new patch is selected. For example, the media application may set a parameter allowing a patch to survive (and to continue controlling the output of sounds) despite no longer being selected. As another example, the media application may set a parameter for a patch to resonate or to fade after a new patch is selected.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 4 is a schematic view of an illustrative data structure for mapping input mechanisms to media application parameters in accordance with one embodiment of the invention;

FIG. 6 is a schematic view of an illustrative data structure for assigning input mechanisms to screen objects in accordance with one embodiment of the invention;

FIG. 7 is a schematic view of an illustrative data structure for mapping screen objects to media application parameters in accordance with one embodiment of the invention;

DETAILED DESCRIPTION

Figure 1:
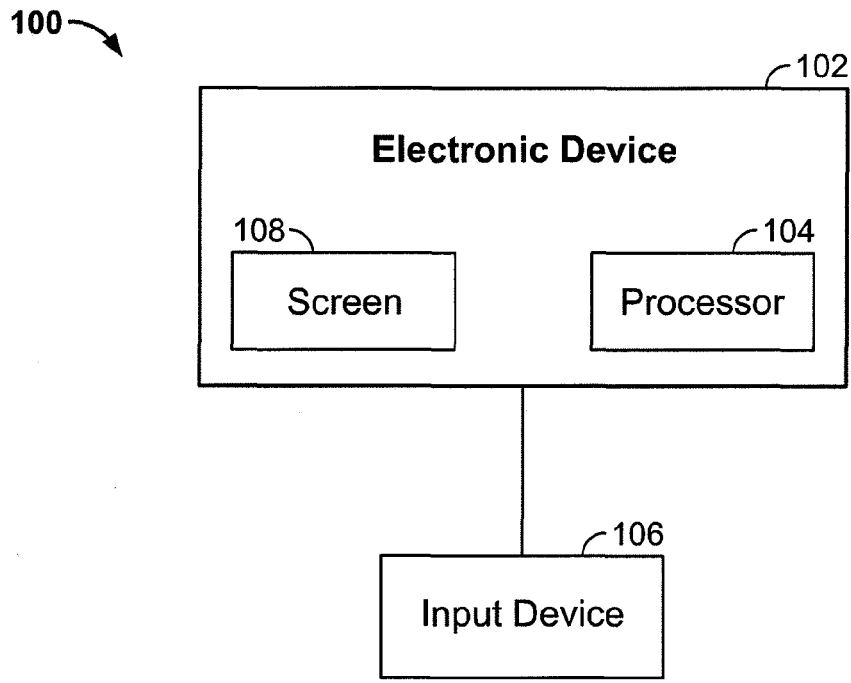
FIG. 1 is a schematic view of an illustrative system the user may access a media application for controlling the output of media in accordance with one embodiment of the invention.

FIG. 1 is a schematic view of an illustrative system the user may access a media application for controlling the output of media in accordance with one embodiment of the invention. System 100 may include electronic device 102. Electronic device 102 may include any electronic device with which a user may access media objects (e.g., images, videos, music or other files). Suitable electronic devices may include, for example, a computer, a cellular telephone, a mobile communications device, a personal media device, a set-top box, a television system, combinations thereof (e.g., the iPhone, available from Apple Inc. of Cupertino, Calif.) or any other suitable electronic device.

Electronic device 102 may include processor 104 for performing the operations of electronic device 102. Processor 104 may be coupled to any other suitable component of electronic device 102. For example, processor 104 may be coupled to memory, a storage device, communications circuitry, a display, audio circuitry, a bus, an I/O component, audio output circuitry, or any other suitable component.

System 100 may include input device 106 coupled to processor 104 for providing user inputs to electronic device 102. Input device 106 may be coupled to processor 104 using any suitable connection, including for example any suitable wired or wireless connection. Input device 106 may include any suitable mechanism for providing user inputs or instructions to electronic device 102. Input device 106 may take a variety of forms, such as one or more buttons, keyboard, keypad, dial, click wheel, mouse, or a touch screen. In some embodiments, input device 106 may include a device that provides audio or music outputs. For example, input device 106 may include a musical instrument (e.g., a keyboard, drum pad, or a guitar), an audio control device (e.g., a mixing console or a foot pedal), or any other musical or audio input device. It will be understood that media system 100 may include several input devices 106. For the clarity of the figure, however, only one is shown.

Screen 108 may be any suitable screen for displaying media objects or other content to a user. For example, screen 108 may be a television, a projector, a monitor (e.g., a computer monitor), a media device display (e.g., a media player or video game console display), a communications device display (e.g., a cellular telephone display), a component coupled with a graphical output device, any combinations thereof, or any other suitable screen. In some embodiments, screen 108 may be operative to provide an audio output.

Users of the electronic device may access various applications, including media applications, implemented on the electronic device. For example, the electronic device may include an application for providing multi-instrument and effects processes to a user (e.g., during a live band performance). In some embodiments, media applications may be operative to create, record, edit, mix, produce and publish media, such as for example audio, music, videos, or combinations of these (e.g., music videos or motion pictures). Using a media application implemented on the electronic device, users may generate and produce media content that is published in real time (e.g., music at a live concert).

Figure 2:
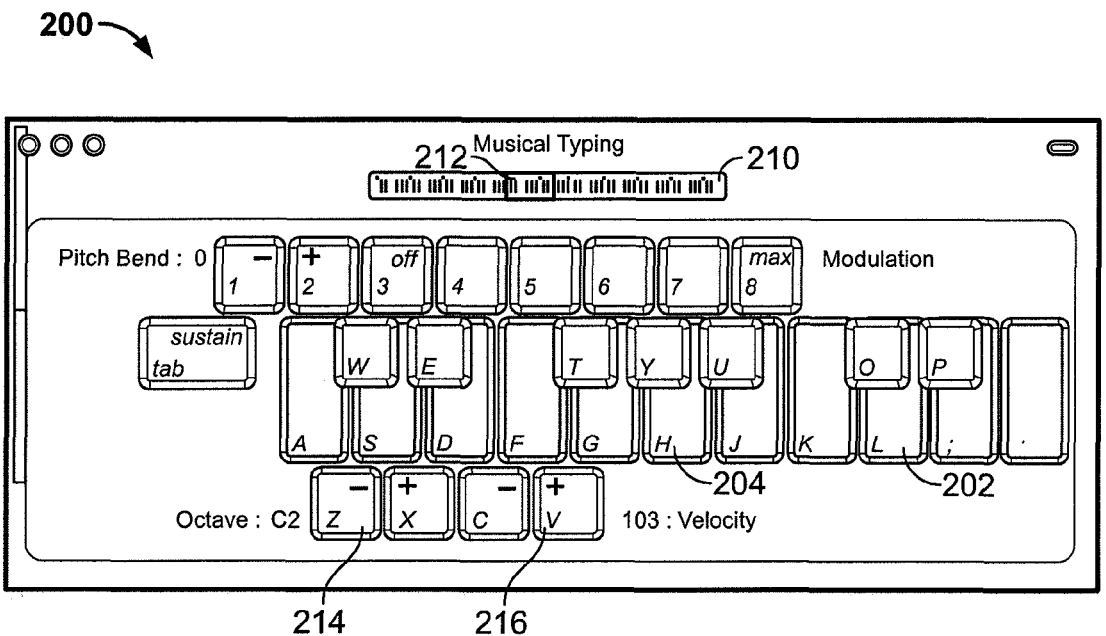
FIG. 2 is an illustrative display of a musical typing mode in accordance with one embodiment of the invention.

Users may provide inputs (e.g., inputs associated with a musical note) to the media application using any suitable approach. In some embodiments, the user may use a computer keyboard to provide musical notes to the media application. FIG. 2 is an illustrative display of a musical typing mode in accordance with one embodiment of the invention. Musical keyboard display 200 may be displayed on screen 108 (FIG. 1) to provide a user with an on-screen display of the correspondence between keyboard keys and musical notes. Keyboard display 200 may include keys 202, each of which may be correspond to a letter 204 (or other key) from a computer keyboard (e.g., input device 106, FIG. 1). Keyboard display 200 may include musical keys 210 spanning several octaves, and shaded portion 212 identifying the currently played octave. The user may change octaves by selecting octave keys 214. The user may also change the velocity at which the media application determines keys to be pressed by selecting the computer keyboard keys identified by velocity tag 216. To provide musical inputs using the computer keyboard, the user to first activate the musical typing mode (e.g., by selecting an associated option). In some embodiments, keyboard display 200 may be displayed when the musical typing mode is active.

In some embodiments, users may use a media input device, such as a MIDI (i.e., Musical Instrument Digital Interface) input device to provide audio inputs. In response to receiving the data corresponding to the audio inputs received from the media input device (e.g., input device 106, FIG. 1), the media application may decode the received data and produce a media output (e.g., an audio output) that reflects the received data and the currently enabled parameters and settings of the media application (e.g., the currently enabled patch and channel strip, described below).

The media application may use any suitable approach for organizing the parameters and settings that define the media (e.g., the audio) output in response to receiving particular data from the input device. For example, the media application may set (e.g., automatically or in response to a user instruction) one or more instruments and associated parameters that define the output corresponding to a particular data input (e.g., pressing a key on a MIDI keyboard causes the media application to play a note on an organ). The instruments and associated parameters may be provided as part of a channel strip. At any given time, the media application may enable one or more channel strips to allow the user to output one or more different sounds in response to input device data.

In some embodiments, the media application may combine one or more channel strips to create a particular sound, such as layered sounds or keyboard splits. For example, the media application may combine channel strips associated with different instruments (e.g., a piano and a synthesizer) to create a layered sound. As another example, the media application may associate different settings with different key ranges (e.g., lower key range of the input device has an effect that the higher key range does not have). The media application may define patches that include all of the channel strips used to create a particular sound (e.g., each desired sound may be defined by the channel strips of a patch). Each patch may include any suitable number of channel strips. In some embodiments, each patch may be limited to a particular number of channel strips (e.g., 32 channel strips). The media application may then combine all of the patches of a particular project into a concert.

In some embodiments, the user may control parameters of one or more channel strips by controlling input mechanisms incorporated on the input device. For example, input device 106 (FIG. 1) may include one or more knobs, buttons, sliders, or other input mechanisms operative to provide inputs to media system 100 (FIG. 1). In some embodiments, the input mechanism may include a MIDI controller. The user may associate each input mechanism with one or more particular media application parameters. For example, the user may associate each input mechanism with the control of one of volume, tone, base, treble, tuning, trim, gain and amplification of audio signals received from input device 106.

Figure 3:
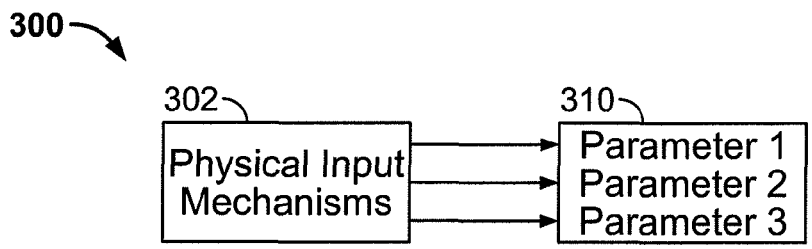
FIG. 3 is a schematic view of an illustrative mapping between physical input mechanisms of an input device and media application parameters in accordance with one embodiment of the invention.

The media application may map the physical input mechanisms of input device 106 to media application parameters using any suitable approach. In some media systems, the media application may map physical input mechanisms directly to media application parameters. FIG. 3 is a schematic view of an illustrative mapping between physical input mechanisms of an input device and media application parameters in accordance with one embodiment of the invention. Mapping 300 may include physical input mechanisms 302, which may include any input mechanism of an input device used to provide data or commands to the media application (e.g., input device 106, FIG. 1). Input mechanisms 302 may be operative to provide data or other electric signals to the media application. In some embodiments, each input mechanism 302 may provide identifying information with the data transmitted so that the media application may associate received data with the media application parameters or feature that the user wishes to control. For example, if input mechanisms 302 provides MIDI outputs, the MIDI data provided by input mechanisms 302 may include an identification number specifying the particular input mechanism from which the data is provided.

Each physical input mechanism 302 may be mapped to one or more parameter 310 of the media application via mapping 300. FIG. 4 is a schematic view of an illustrative data structure for mapping input mechanisms to media application parameters in accordance with one embodiment of the invention. Data structure 400 may include column 402 of input mechanism IDs and column 410 of media application parameters. A unique identifier for each input mechanism of input device 106 may be stored in each row of column 402. For example, if each input mechanism is a MIDI controller, the unique identifier stored in column 402 may be the MIDI number associated with the input mechanism.

Column 410 may include identification information for media application parameters controlled by the input mechanisms. The media application may map a parameter to a particular input mechanism by storing the parameter in the row identified by the particular input mechanism ID (e.g., parameter 2 map be mapped with input mechanism B). The user may direct the media application to map an input mechanism to a parameter using any suitable approach. In some embodiments, the user may enable a "learn" mode of the media application. In response to enabling the learn mode, the media application may monitor incoming data received from input mechanisms of the input device (e.g., input device 106, FIG. 1) to identify each input mechanism as it is operated (e.g., as the user turns each knob or moves each slider). To map a particular input mechanism, the user may operate the input mechanism, allowing the media application to identify the particular input mechanism (e.g., from identifying data provided by the mechanism), and select a media application parameter to which the particular input mechanism may be mapped (e.g., select the parameter from an on-screen option). The user may then repeat this process to map the remaining input mechanisms to media application parameters.

Although this approach may be allow the user to map input mechanisms with media application parameters, the mapping may be lost when the user switches input devices. For example, when a user removes a keyboard and connects a mixing console, or removes a first keyboard and connects a second keyboard, the mapping between the input mechanisms of the keyboard and the media application parameters may be lost (e.g., because the input mechanisms of the new device may not have the same ID, for example MIDI number, as the input mechanisms of the initial keyboard). In addition, if the user has mapped parameters for several instruments (e.g., in several patches), the mapping map be lost and must be repeated for each instrument.

Figure 5:
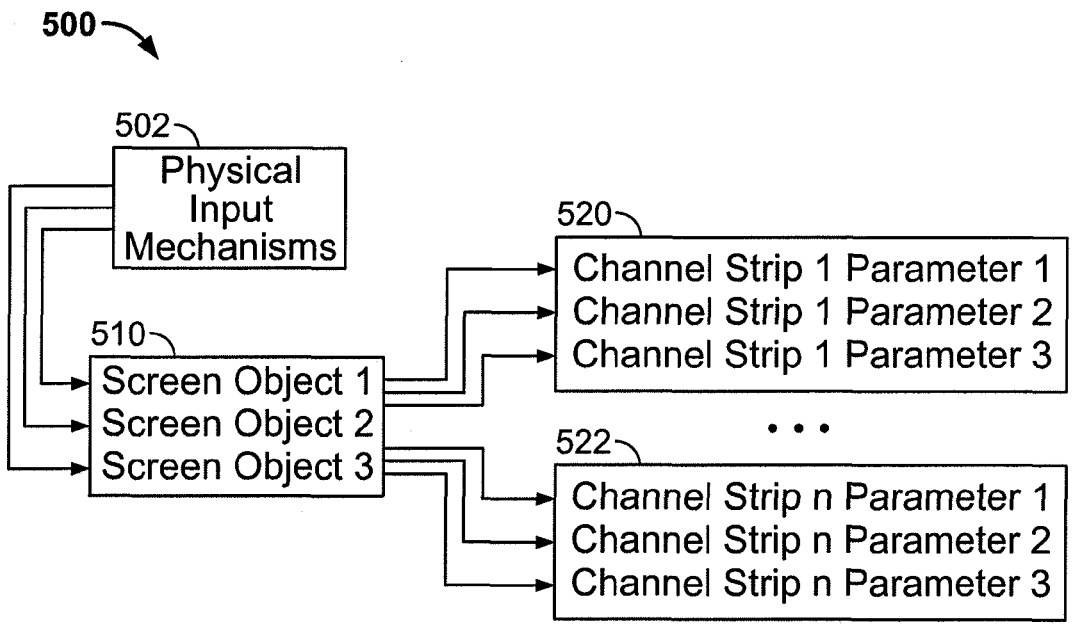
FIG. 5 is a schematic view of an illustrative indirect mapping between input mechanisms and media application parameters in accordance with one embodiment of the invention.

In some embodiments, the media application may instead provide indirect mapping between input mechanisms and media application parameters. FIG. 5 is a schematic view of an illustrative indirect mapping between input mechanisms and media application parameters in accordance with one embodiment of the invention. Mapping 500 may include physical input mechanisms 502, which may include any input mechanism of an input device used to provide data or commands to the media application (e.g., input device 106, FIG. 1). Similar to input mechanisms 302, input mechanisms 502 may be operative to provide data or other electric signals to the media application. In some embodiments, each input mechanism 502 may provide identifying information with the data transmitted so that the media application may associate received data with the media application parameters or feature that the user wishes to control (e.g., using MIDI data).

Each physical input mechanism 502 may be assigned to an screen object 510. Each screen object 510 may be displayed to the user on the display screen of the electronic device (e.g., display screen 108, FIG. 1). Screen objects 510 may have any suitable appearance, including for example the appearance of input mechanisms 502 (e.g., knobs, sliders, wheels, or buttons). FIG. 6 is a schematic view of an illustrative data structure for assigning input mechanisms to screen objects in accordance with one embodiment of the invention. Data structure 600 may include column 602 of input mechanism IDs and column 610 of screen objects. A unique identifier for each input mechanism of input device 106 may be stored in each row of column 602. For example, if each input mechanism is a MIDI controller, the unique identifier stored in column 602 may be the MIDI number associated with the input mechanism.

Column 610 may include identification information for screen objects assigned to the input mechanisms. The media application may assign a screen object to a particular input mechanism by storing the identification information for the screen object in the row identified by the particular input mechanism ID (e.g., screen object 2 map be assigned to input mechanism b). The user may direct the media application to assign an input mechanism to a screen object using any suitable approach. In some embodiments, the user may enable a "learn" mode of the media application. In response to activating the learn mode, the media application may monitor incoming data received from input mechanisms of the input device (e.g., input device 106, FIG. 1) to identify each input mechanism as it is operated (e.g., as the user turns each knob or moves each slider). To assign a screen object to a particular input mechanism, the user may operate the input mechanism, allowing the media application to identify the particular input mechanism (e.g., from identifying data provided by the mechanism), and select a screen object to assign to the particular input mechanism (e.g., select a screen object displayed on display 108). The user may then repeat this process to assign screen objects to the remaining input mechanisms.

Returning to mapping 500 of FIG. 5, screen objects 510 may be mapped to the parameters of several channel strips 520 and 522. Although the following discussion will refer to the parameters of channel strips, it will be understood that any other suitable grouping of parameters (e.g., patches) may be used. For example, screen objects 510 may be mapped to a first set of parameters 520 when the media application enables channel strip 1, and screen objects 510 may be mapped to a second set of parameters 522 when the media application enables channel strip 2. The media application may allow mapping of screen objects to parameters for any suitable number of channel strips (e.g., up to the number of channel strips supported by the system resources). FIG. 7 is a schematic view of an illustrative data structure for mapping screen objects to media application parameters in accordance with one embodiment of the invention. Data structure 700 may include column 702 of screen objects and columns 710*a* and 710*n* of parameters. Column 702 may include identification information for each screen object. For example, column 702 may include a unique identifier assigned by the media application to each screen object.

The media application may map a screen object to a particular parameter in a channel strip by storing the particular parameter in the column associated with the patch (e.g., column 710*a*) and in the row identified by the screen object identification information (e.g., screen object b map be mapped to parameter 2). The user may direct the media application to map a screen object with a parameter using any suitable approach. For example, the media application may first select a channel strip (e.g., receive a user selection of a channel strip), and subsequently receive an instruction from the user (e.g., using an input device to control objects displayed on the display) to map a parameter to a screen object. The media application may automatically update data structure 700 in response to a user instruction to perform a mapping. In some embodiments, data structures 600 and 700 may be combined in one data structure.

By providing screen objects as an intermediary, the media application may save the mappings between screen objects and media application parameters, even when the user removes or replaces the input device (e.g., and thus changes the input mechanisms). Then, the user must simply re-assign the new input mechanisms to the screen objects to complete the mapping between the input mechanisms and the media application parameters.

Figure 8:
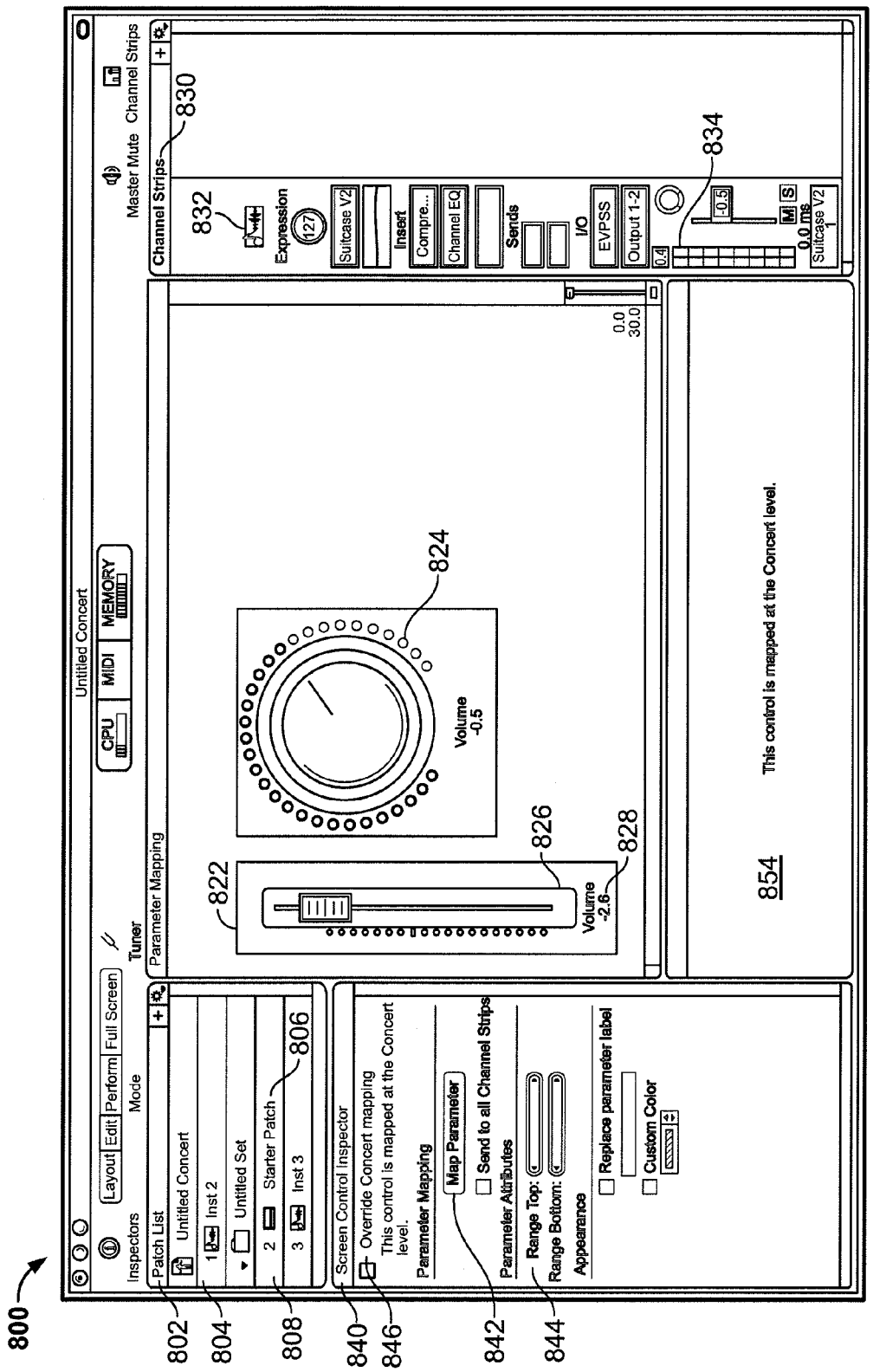
FIG. 8 is an illustrative display of a media application screen that includes screen objects mapped to media application parameters in accordance with one embodiment of the invention.

FIG. 8 is an illustrative display of a media application screen that includes screen objects mapped to media application parameters in accordance with one embodiment of the invention. Display screen 800 may include patch list 802, parameter mapping 820, channel strip menu 830, and screen control inspector 840. Patch list 802 may include tree 804 of patches 706 defined for the current media application project (e.g., the current concert or recording). The media application may indicate that a particular patch is enabled or active (e.g., and input mechanism instructions control the parameters defined for the particular patch) in any suitable manner, including for example a highlight region, shading (e.g., shading 808), or any other suitable manner.

Screen objects may be displayed for each selected patch in parameter mapping 820. In the example of FIG. 8, parameter mapping 820 may include screen object 822 and screen object 824. In some embodiments, screen objects 822 and 824 may resemble input mechanisms of the input device (e.g., input device 160). For example, if the input mechanism includes a slider, screen object 822 assigned to the slider may depict a slider. In some embodiments, the user may select the type of screen object 822 displayed in parameter mapping 820. In some embodiments, the media application may automatically identify the type of input mechanism used (e.g., based on identification information, such as MIDI data, provided by the input mechanism), and display a screen object that resembles the identified input mechanism.

Screen objects 822 and 824 may be displayed using any suitable approach. In some embodiments, the user may select to add a new screen object to parameter mapping 820 (e.g., by providing an instruction to add a new screen object, for example using a menu). The user may then, using a "learn" mode, assign a particular input mechanism of the input device to the new screen object. In some embodiments, the media application may automatically display screen objects as the media application identifies different input mechanisms providing data to the electronic device. For example, in the "learn" mode, the media application may display a new screen object for every input mechanism actuated by the user. The media application may use any suitable screen object, including for example an arbitrary or default screen object (e.g., first screen object displayed is a slider, and subsequent screen objects are knobs), a screen object that resembles the assigned input mechanism (e.g., identified from the data provided by the input mechanism), or any other screen object.

In some embodiments, if the patch selected in patch list 802 is a child patch, the media application may display the screen objects associated with the parent patches. For example, screen object 822, which may be mapped with the master volume parameter, may be associated with the ultimate parent patch (e.g., Concert), may be displayed with screen object 824, which may be a screen object specific to the selected child patch (e.g., the patch identified by shading 808).

Figure 8A:
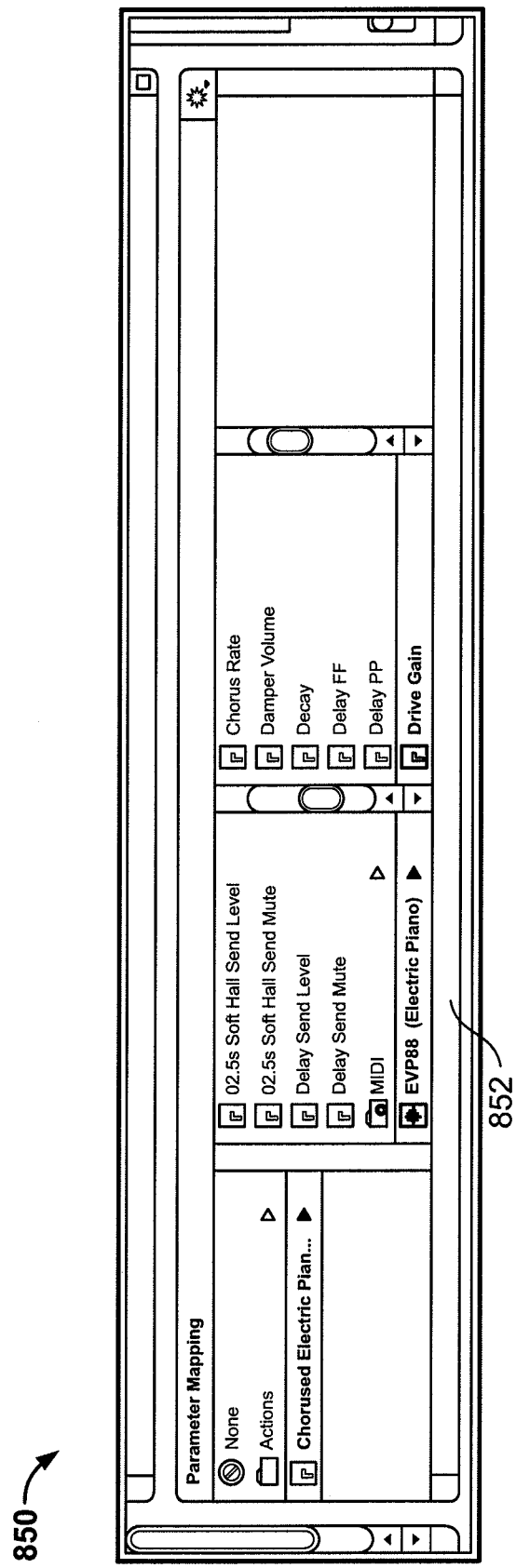
FIG. 8A is an illustrative display of a parameter map in accordance with one embodiment of the invention.

The user may select a parameter to map to a screen object (e.g., screen object 822) using any suitable approach. For example, the user a screen object, and select a parameter 834 of displayed channel strip 832 in channel strip menu 830. In some embodiments, parameter mapping using parameters displayed in channel strip menu 830 may only be enabled in response to selecting a "Map Parameter" option (e.g., a displayed button or menu item). As another example, the user may select a screen object (e.g., identified by highlight region 826), access screen control inspector 840 and select a parameter using a parameter map. FIG. 8A is an illustrative display of a parameter map in accordance with one embodiment of the invention. Parameter map 850, which may include parameter tree 852 of available parameters to map, may be displayed in response to selecting parameter map option 842. In some embodiments, parameter map 850 may be displayed, for example, in portion 854 of display 800. Once a user has selected a parameter to map to a screen object (e.g., selected screen object 822), the media application may display label 828 with screen object 822 to allow the user to easily identify the parameter mapped to a displayed screen object.

In some embodiments, the user may modify the attributes of a selected parameter using parameter attributes options 844. For example, the user may edit the velocity sensitivity for a channel strip (e.g., the range of input velocities for which the channel strip is enabled), create controller transforms, filter messages received from the input device (e.g., filter received MIDI messages), or modify any other suitable parameter.

In some embodiments, the user may select a screen object set in a parent patch while a child patch is active. In response to selecting the parent screen object, the media application may initially grey out or otherwise make unavailable the mapping to the selected parent screen object. The media application may require the user to affirmatively direct the media application to override the parent patch mapping to allow the screen object to be re-mapped (e.g., by selecting "override" option 846).

Figure 8B:
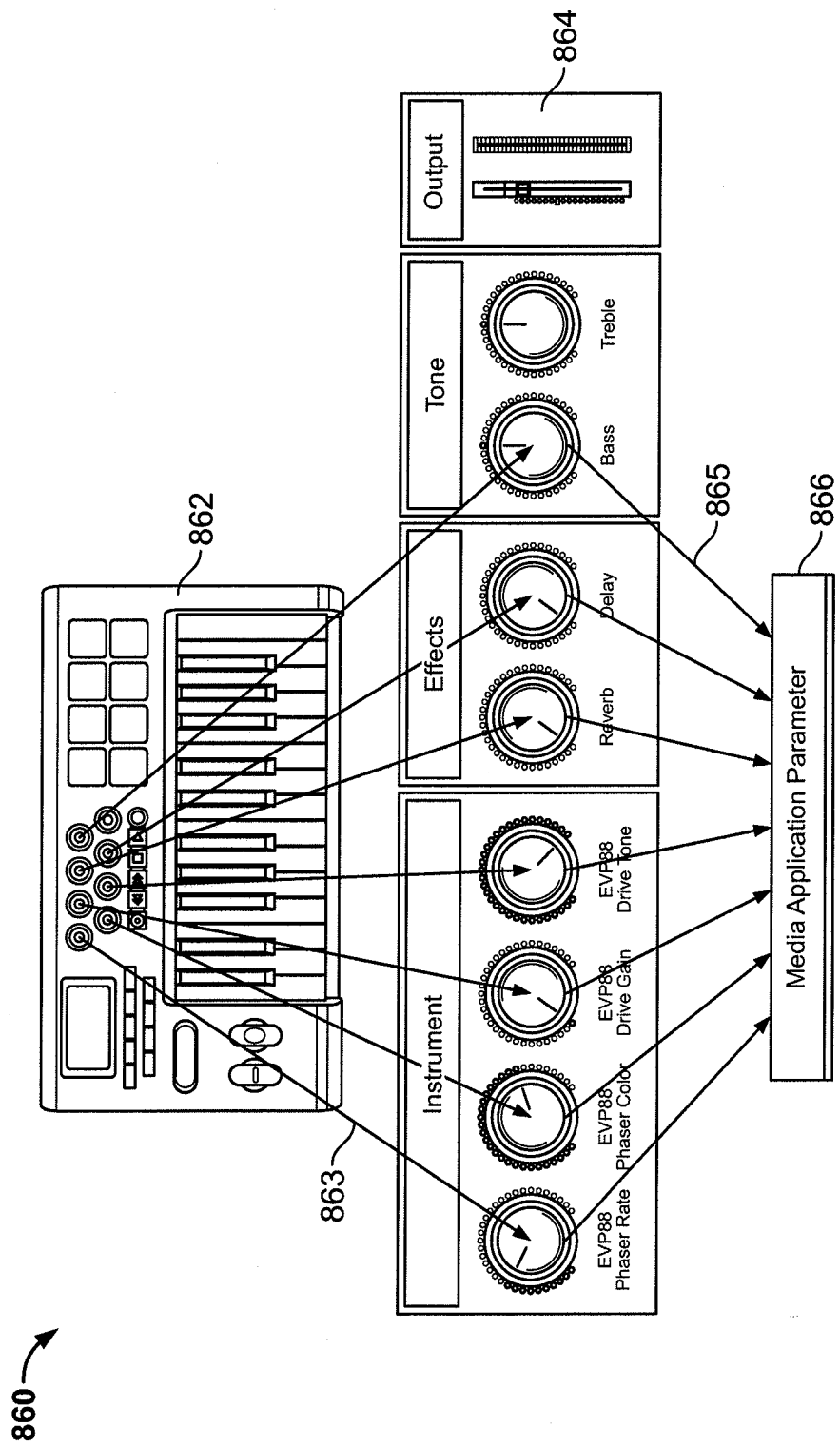
FIGS. 8B and 8C are schematic displays of a media system in which different input mechanisms are assigned to screen objects while screen objects are mapped to media application parameters in accordance with one embodiment of the invention.
Figure 8C:
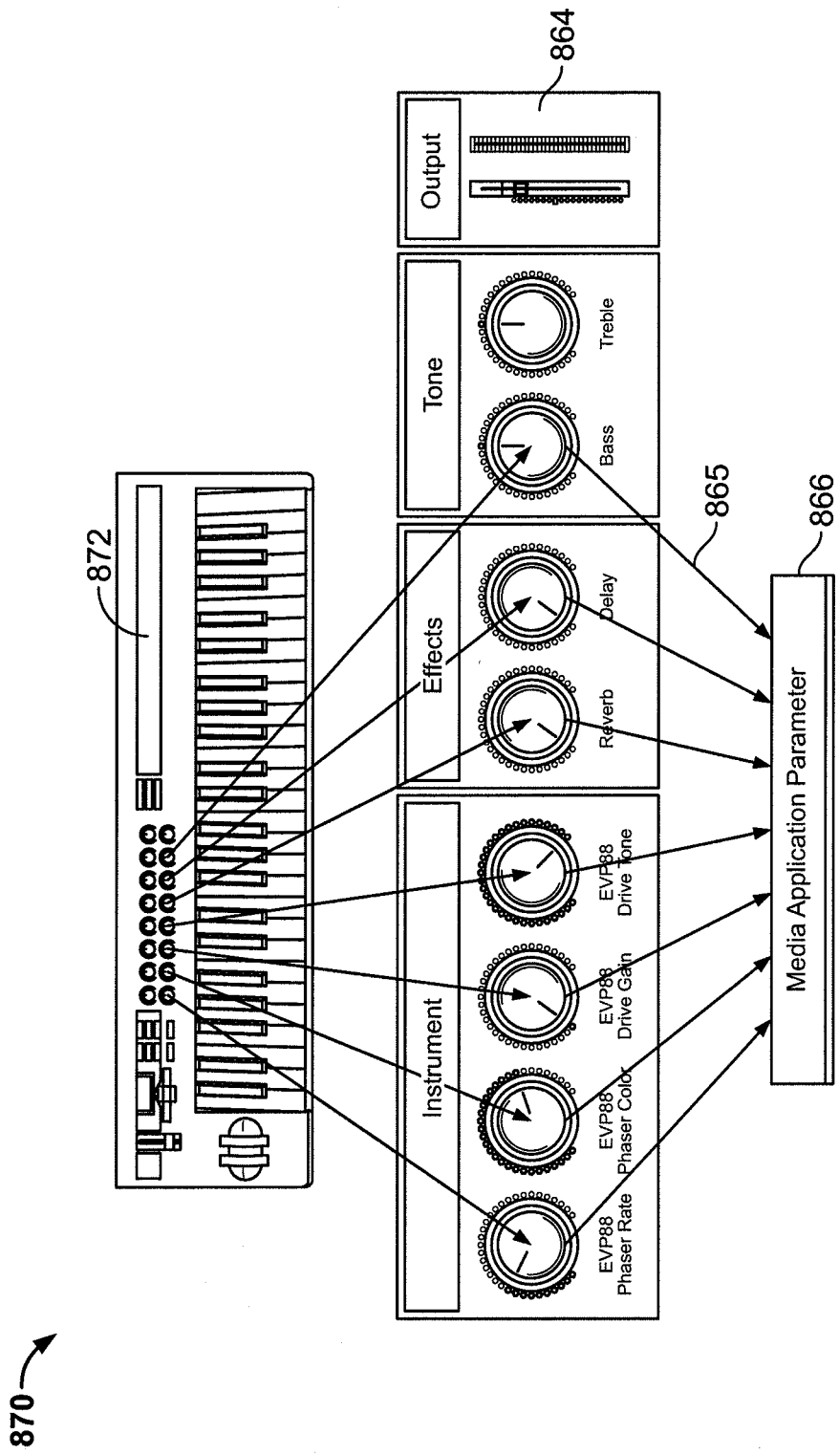

FIGS. 8B and 8C are schematic displays of a media system in which different input mechanisms are assigned to screen objects while screen objects are mapped to media application parameters in accordance with one embodiment of the invention. System 860 may include input device 862, which may include several input mechanisms assigned to screen objects 864 by assignments 863. Screen objects 864 may in turn be mapped to media application parameters 866 using mapping 865.

In system 870, when the user switches from input device 862 to input device 872, mapping 865 from screen objects 864 to media application parameters 866 may be retained. To complete the setup, the user may simply re-assign the input mechanisms of input device 872 to screen objects 864 by assignments 873.

Figure 9:
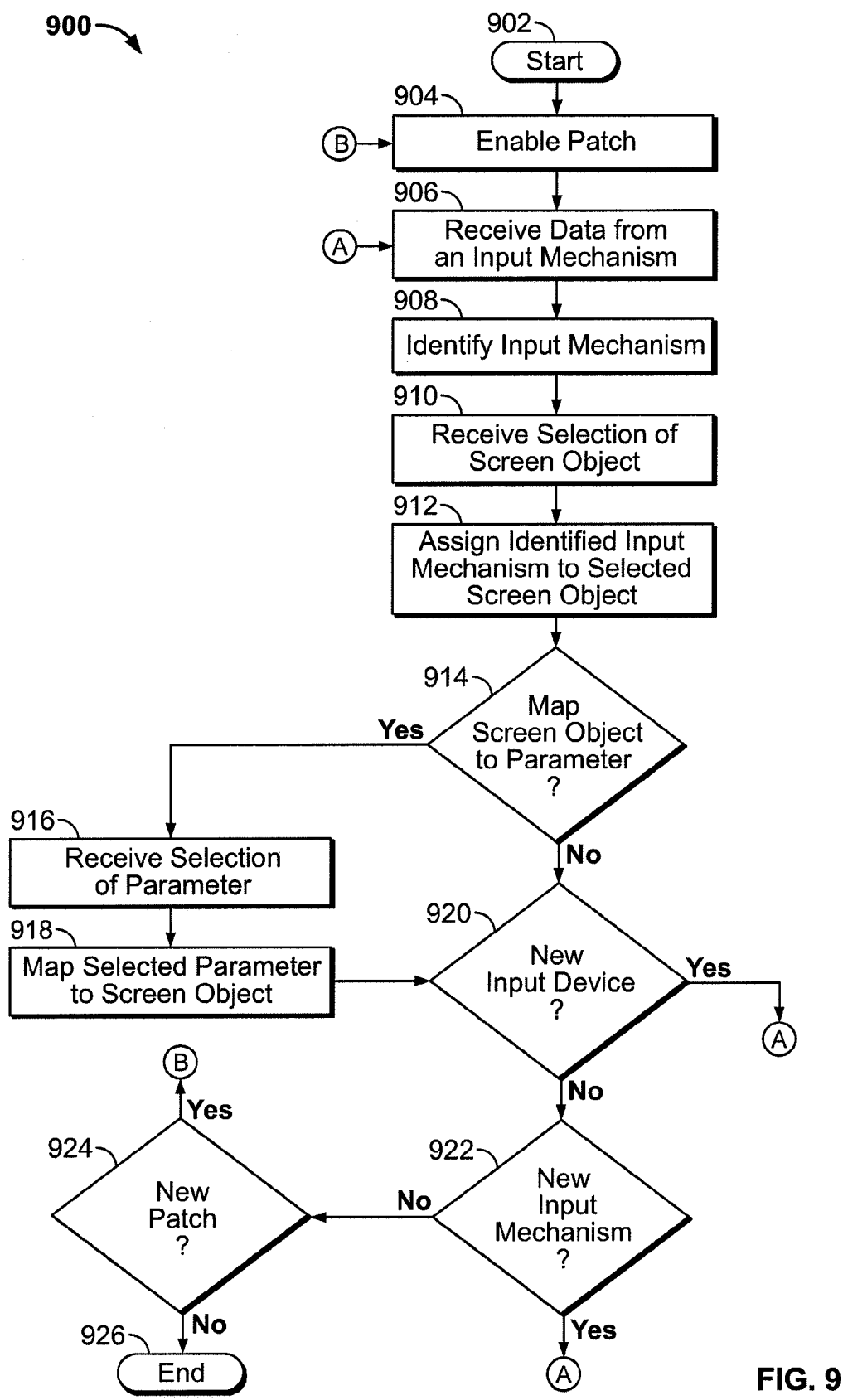
FIG. 9 is a flowchart of an illustrative process for indirectly mapping a physical input mechanism to a media application parameter in accordance with one embodiment of the invention.

FIG. 9 is a flowchart of an illustrative process for indirectly mapping a physical input mechanism to a media application parameter in accordance with one embodiment of the invention. In some embodiments, the media application may only call process 900 when the "learn" mode is enabled, or when the user has provided an indication to assign input mechanisms or to map parameters to screen objects. Process 900 may begin at step 902. At step 904, the media application may enable a patch. For example, the media application may receive a user request to enable or activate a particular patch. As another example, the media application may automatically enable a patch (e.g., if only a single patch is available). At step 906, the media application may receive data from an input mechanism. For example, the media application may receive the output of an input mechanism in response to a user actuating the input mechanism. At step 908, the media application may identify the input mechanism providing the data received at step 906. For example, the media application may extract identification information from the data received at step 906 (e.g., an MIDI number).

At step 910, the media application may receive a selection of a screen object. For example, the media application may receive a user selection of a screen object (e.g., screen object 822, FIG. 8). As another example, the media application may automatically select a screen object (e.g., a new screen object created or selected for the newly identified input mechanism). At step 912, the media application may assign the input mechanism identified at step 908 with the screen object selected at step 910. For example, the media application may update a data structure that includes the assignment of input mechanisms to screen objects to reflect the new assignment of the identified input mechanism to the selected screen object (e.g., data structure 600, FIG. 6).

At step 914, the media application may determine whether to map the selected screen object to a parameter. For example, the media application may determine whether the selected screen object has been previously mapped to a parameter (e.g., within the enabled patch, which may include parent patches). As another example, the media application may determine whether the user has provided an indication to modify an existing mapping of the selected screen object (e.g., the user has selected a new parameter for the mapping). If the media application determines to map the selected screen object to a parameter, process 900 may move to step 916.

At step 916, the media application may receive a selection of a parameter. For example, the media application may receive a user selection of a parameter (e.g., receive a user selection of a parameter in response to selecting parameter map option 842, FIG. 8). As another example, the media application may select a default parameter (e.g., the most common un-mapped parameter, or a parameter commonly mapped with the selected screen object). At step 918, the media application may map the selected parameter to the selected screen object. For example, the media application may update a data structure that includes the mapping of screen objects and parameters to reflect the new mapping of the selected parameter to the selected screen object (e.g., data structure 700, FIG. 7). Process 900 may then move to step 920.

If, a step 914, the media application instead determines not to map the selected screen object to a parameter, process 900 may move to step 920. At step 920, the media application may determine whether a new input device has been coupled to the electronic device (e.g., input device 106 coupled to electronic device 102, FIG. 1). For example, the media application may determine whether the user has replaced the prior input device with a new input device (e.g., using identification data received from the input device). As another example, the media application may determine whether the user has coupled an input device to the electronic device when there previously was no input device. If the media application determines that a new input device has been coupled to the electronic device, process 900 may move back to step 906 and identify new input mechanisms to associate with the screen objects. If, at step 920, the media application instead determines that a new input device has not been coupled to the electronic device, process 900 may move to step 922.

At step 922, the media application may determine whether data from a new input mechanism has been received. For example, the media application may determine whether the user has actuated a new input mechanism. As another example, the media application may determine whether the user has enabled the "learn" mode and actuated an input mechanism (e.g., a new input mechanism that the user would like to re-assign to another screen object). If the media application determines that data from a new input mechanism has been received, process 900 may move back to step 906 and identify the new input mechanism. If, at step 922, the media application instead determines that data from a new input mechanism has not been received, process 900 may move to step 924.

At step 924, the media application may determine whether a new patch has been selected. For example, the media application may determine whether the user has selected to enable a new patch (e.g., from patch list 802, FIG. 8). As another example, the media application may automatically select a new patch, for example based on the current status of the media application (e.g., after finishing a track of a song using a first patch, automatically switching to the next patch for the next track of the song). If the media application determines that a new patch has been enabled, process 900 may move back to step 904, and enable the new patch. In some embodiments, the media application may instead or in addition determine whether the user has selected a new channel strip at step 924. If, at step 924, the media application instead determines that a new patch has not been selected, process 900 may end at step 926.

In some embodiments, the media application may map a screen object to a sound mixer. The sound mixer may be operative to blend different amounts of several sounds together, for example blend several channel strips. As the user changes the value of the screen object, for example pressing a foot pedal, the level of each of the sounds (e.g., channel strips) may vary. Using the sound mixer, a user may thus easily vary the sound output by an input device by changing the value of an input mechanism assigned to the appropriate screen object.

Figure 10A:
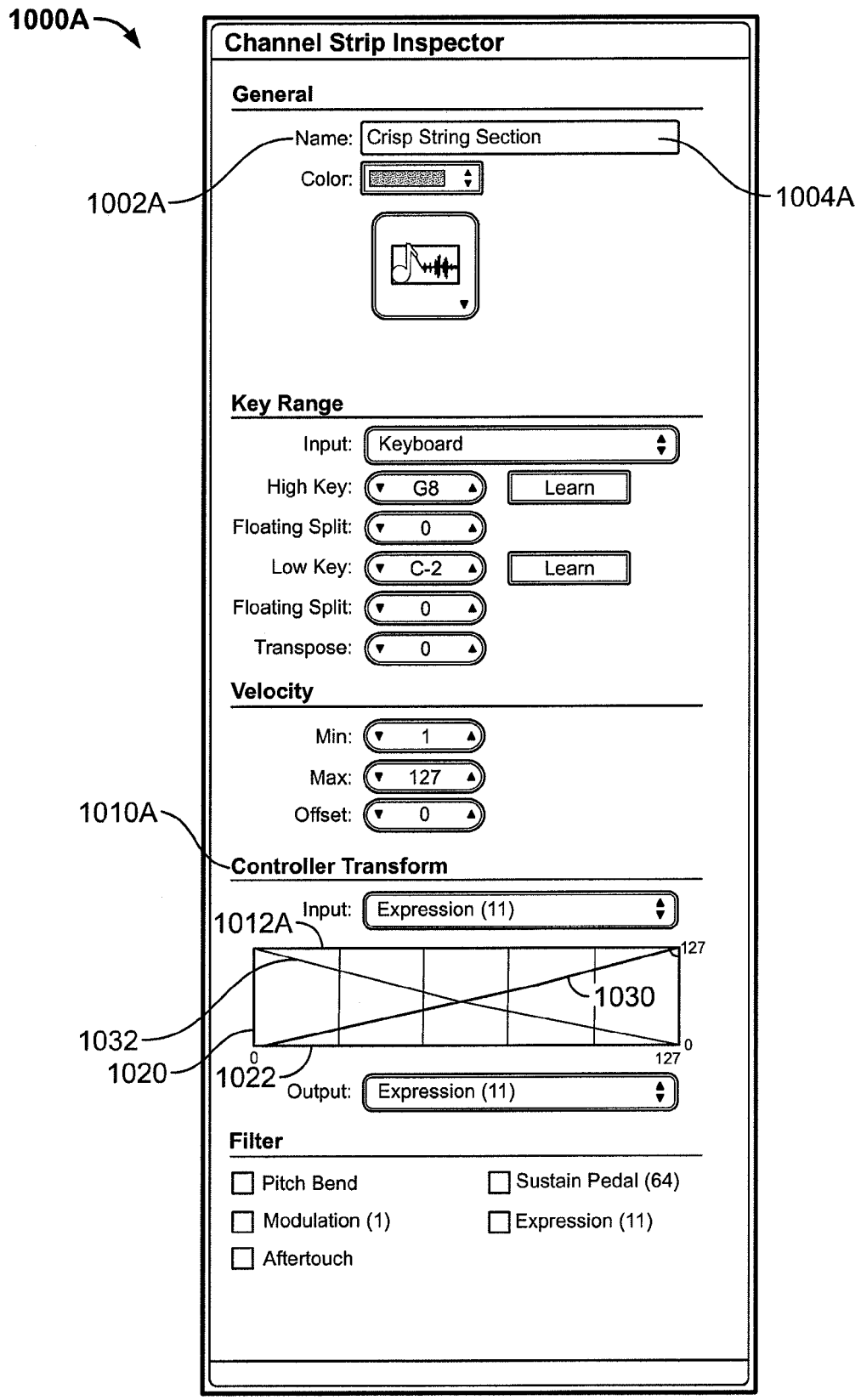
FIGS. 10A and 10B are schematic views of an illustrative channel strip mixer interface in accordance with one embodiment of the invention.
Figure 10B:
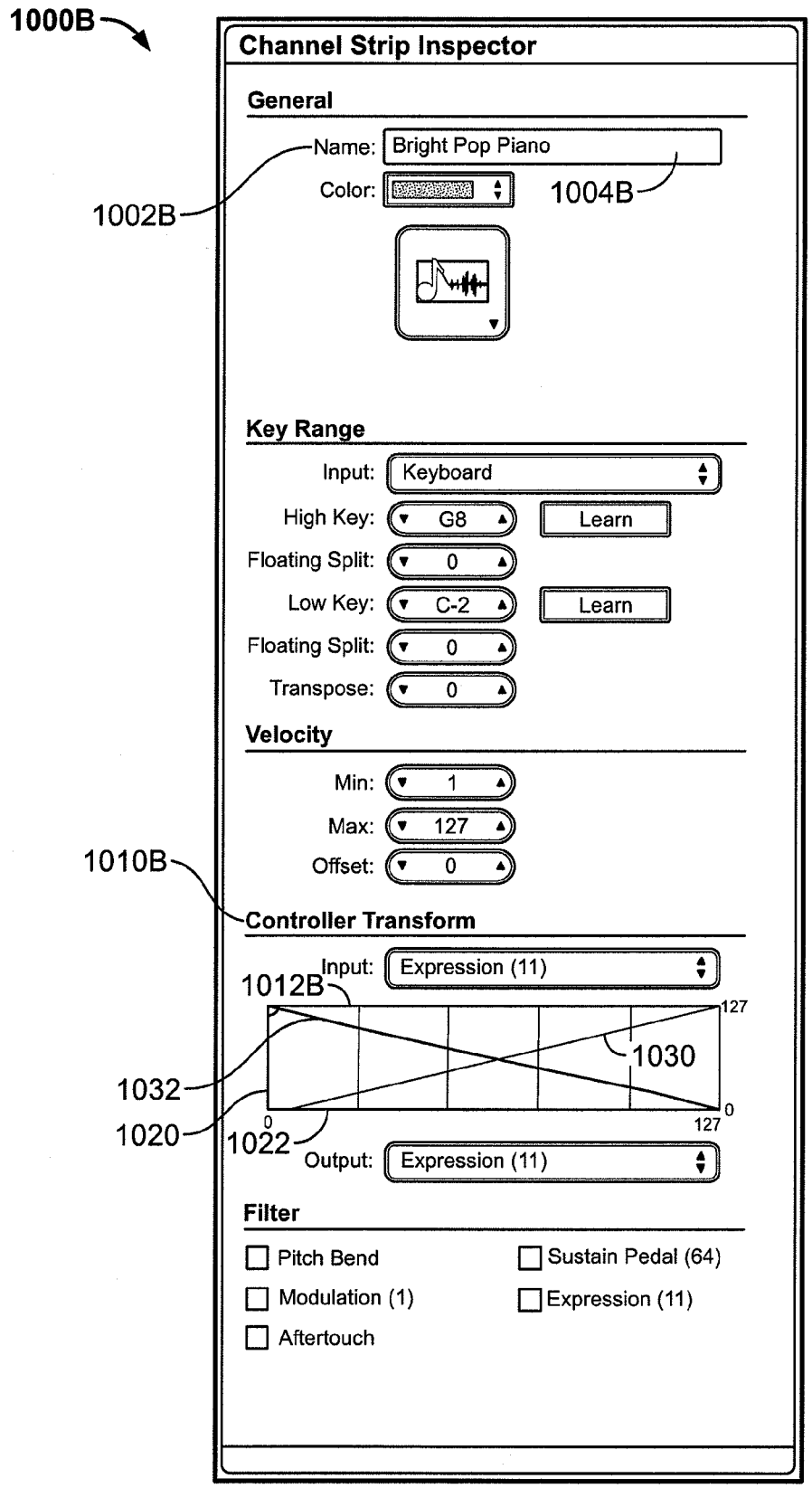
Figure 10C:
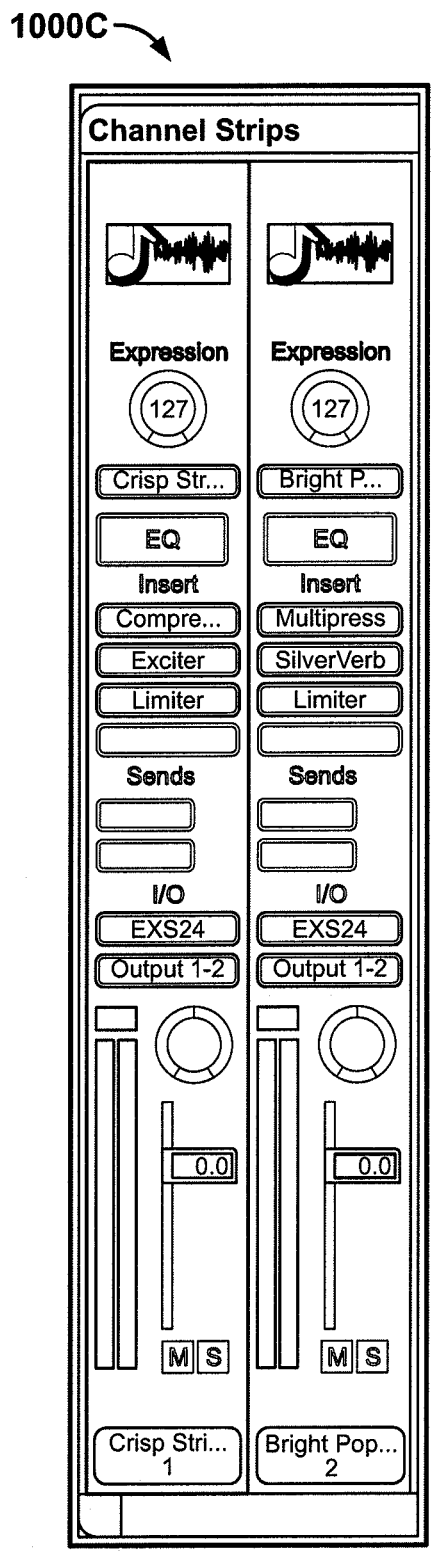
FIG. 10C is a schematic view of channel strips identified in the channel strip mixer interface of FIGS. 10A and 10B in accordance with one embodiment of the invention.

The media application may define the manner in which sounds vary using any suitable approach. In some embodiments, the media application may couple the value of the screen object (e.g., and of the input mechanism to which the screen object is assigned) with a chart graphically depicting the volume of each sound (e.g., each channel strip relative to the value of the screen objection. FIGS. 10A and 10B are schematic views of an illustrative channel strip mixer interface in accordance with one embodiment of the invention. FIG. 10C is a schematic view of channel strips identified in the channel strip mixer interface of FIGS. 10A and 10B in accordance with one embodiment of the invention. Channel strip mixer interfaces 1000A and 1000B may include channel strip identifier 1002A and 1002B, respectively. The user may select an available channel strip using channel strip menu 1004A and 1004B. In some embodiments, the user may select a channel strip from channel strips display 1000C. In the example of FIGS. 10A and 10B, different channel strips are selected in each of channel strip mixer interfaces 1000A and 1000B.

Channel strip mixer interfaces 1000A and 1000B may include controller transforms 1000A and 1010B, respectively. Each of controller transforms 1000A and 1010B may include graph 1012A and 1012B respectively. The y-axis 1020 of each graph may represent the volume or amount of each channel strip that may be played, and the x-axis 1022 of each graph may represent the available values of the screen object to which the controller transform may be mapped. Each of graphs 1012A and 1012B may include curves 1030 and 1032, where curve 1030 may be associated with the channel strip selected in channel strip mixer interface 1000A, and curve 1032 may be associated with the channel strip selected in channel strip mixer interface 1000B. The media application may identify the curve associated with the currently selected channel strip using any suitable approach, including for example changing the color of the curve, bringing the curve to the foreground, sending other curves to the background, or any other suitable approach.

In the example of FIGS. 10A and 10B, the curve associated with each channel strip mixer interface is darkened and brought to the foreground. Curves 1030 and 1032 may be straight lines and symmetrical, such that when the value of the screen object is at its minimum (e.g., 0), curve 1032 associated with the "Bright Pop Piano" channel strip is the only one providing an output. As the user increases the value of the screen object, the output of the "Bright Pop Piano" channel strip may decrease with the slope of curve 1032, and the output of channel strip "Crisp String Section" associated with curve 1030 may increase with the slope of curve 1030. At the midpoint of the screen object (e.g., MIDI value 63), the media application may output an equal amount of each of the channel strip sections. As the value of the screen object increases to its maximum (e.g., MIDI value 127), the media application may output only the channel strip associated with curve 1030 (e.g., "Crisp String Section").

Figure 11:
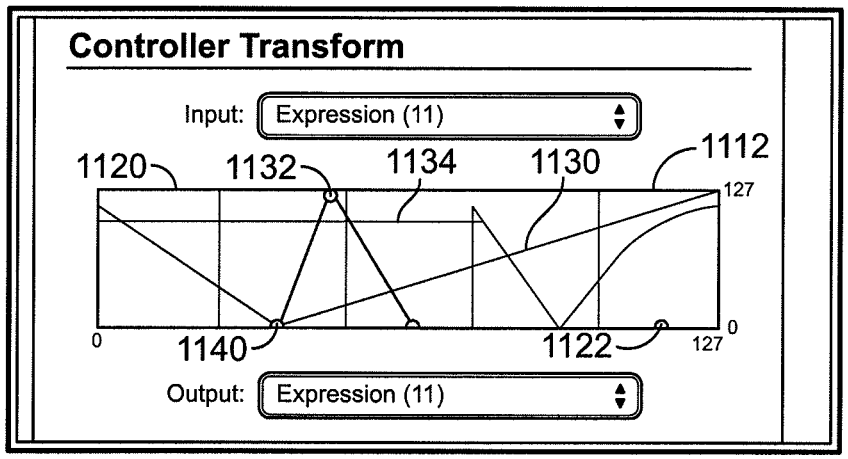
FIG. 11 is a schematic view of another channel strip mixer interface in accordance with one embodiment of the invention.

The user may change the shape of each line 1030 and 1032 using any suitable approach. FIG. 11 is a schematic view of another channel strip mixer interface in accordance with one embodiment of the invention. Channel strip mixer interface 1100 may include graph 1112, in which y-axis 1120 may represent the volume or amount of each channel strip that may be played, and the x-axis 1122 may represent the available values of the screen object to which the controller transform may be mapped. Graph 1112 may include any suitable number of curves (e.g., any suitable number of channel strips may be mapped to the screen object). For example, graph 1112 may include curves 1130, 1132 and 1134. Each of curves 1130, 1132 and 1134 may include any suitable shape. For example, the curves may include a sequence of straight lines. As another example, the curves may include curved portions. The user may define the shape of each curve using any suitable approach. For example, the user may set a parameter for the channel strip associated with a curve to modify the shape of the curve. As another example, the user may select and drag a portion of the line (e.g., drag point 1140 to change the shape of curve 1132). The user may select any suitable point of a curve to drag the curve and modify its shape.

Figure 12:
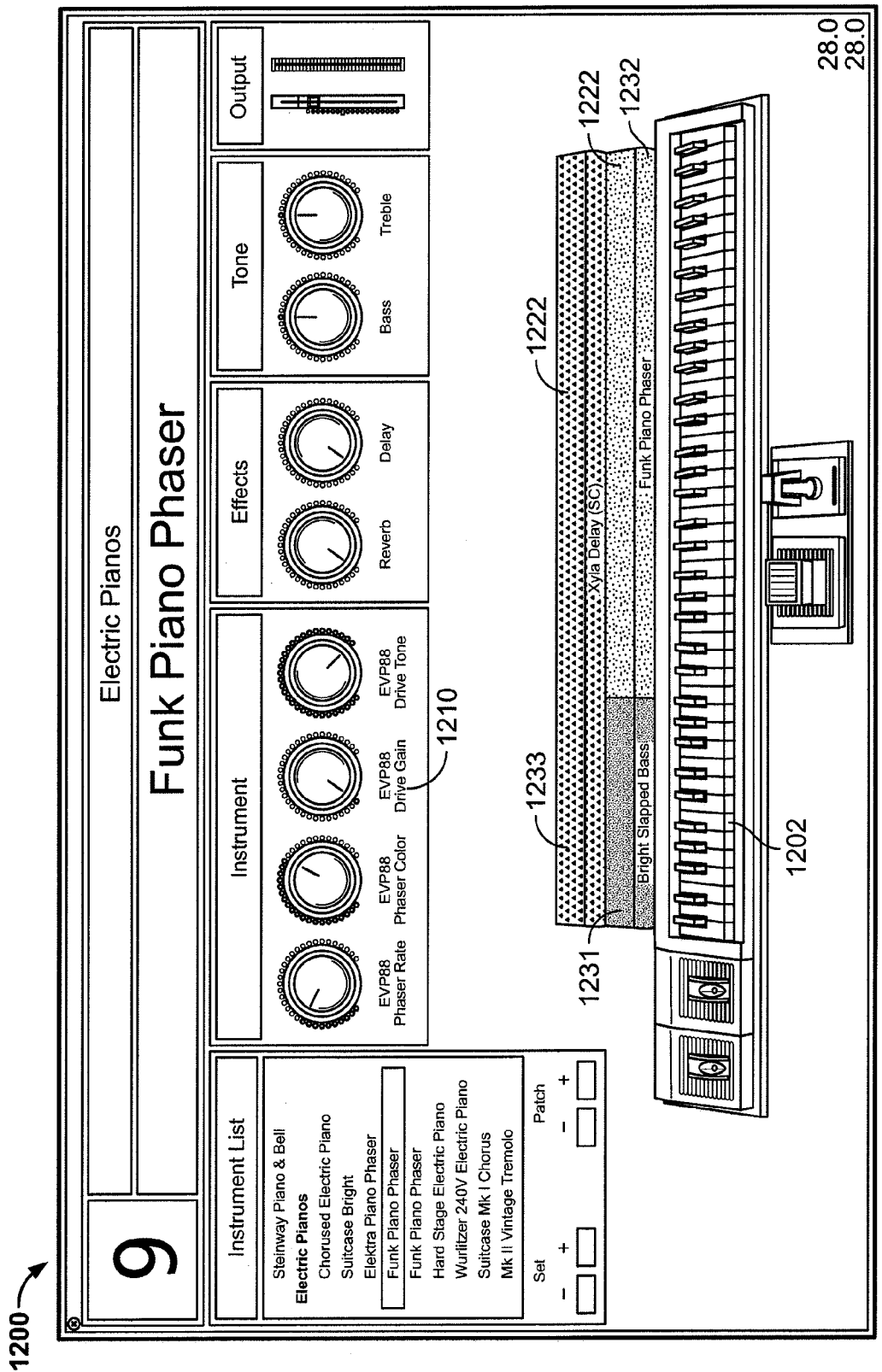
FIG. 12 is a schematic view of an illustrative display screen of a graphical representation of an input device in accordance with one embodiment of the invention.

In some embodiments, the media application may provide a graphical representation of data provided by the input device. For example, the media application may display a graphical representation of the input device coupled to the electronic device (e.g., input device 106 coupled to electronic device 102, FIG. 1). In some embodiments, the graphical representation may be associated with a particular patch currently selected by the user (e.g., a keyboard patch). FIG. 12 is a schematic view of an illustrative display screen of a graphical representation of an input device in accordance with one embodiment of the invention. Display screen 1200 may include instrument 1202 that may resemble the input mechanism (e.g., displayed in a "Perform" mode or in a "Full Screen" mode). For example, if the input device is a keyboard, instrument 1202 may include a graphical representation of a keyboard (e.g., as shown in FIG. 12). As another example, if the input device is a set of drum pads, instrument 1202 may include a graphical representation of drum pads.

Display screen 1200 may include screen objects 1210 of parameters associated with displayed instrument 1202. In some embodiments, screen objects 1210 may be mapped to parameters of one or more channel strips of a selected patch. In addition to instrument 1202 and screen objects 1210, display 1200 may include layers 1220 and 1222 associated with different channel strips of the selected patch. In some embodiments, a single layer 1220 or 1222 may be associated with one or more channel strips of the selected patch (e.g., identified by different colors). In the example of FIG. 12, channel strip 1231 entitled "Bright Slapped Bass" and channel strip 1232 entitled "Funk Piano Phaser" of the selected patch may define layer 1220, and channel strip 1233 entitled "Xyla Delay (SC)" may define layer 1222. The user may change the channel strips placed in each layer using any suitable approach, including for example changing the channel strip parameters (e.g., a layer parameter or a key input velocity parameter), dragging a channel strip in or out of a layer, or any other suitable approach.

Layers may be displayed using any suitable approach. For example, layers 1220 and 1222 may be displayed along a y-axis (e.g., the height of the display screen) to indicate the sequential order in which a user may access the channel strips associated with each of layers 1220 and 1222. For example, the user may first access the channel strips of layer 1220, and then access the channel strips of layer 1222. The user may access layers 1220 and 1222 using any suitable approach. For example, the user may access layers 1220 and 1222 based on a measure of the manner in which the user pressed a key of the input device (e.g., the key of a keyboard).

In some embodiments, the media application may provide access to upper layers (e.g., layer 1222) based on the strength or velocity with which the user provided an input using the input device (e.g., based on the velocity at which the user pressed a key of a keyboard coupled to the electronic device). For example, the channel strips of layer 1220 may be accessed when the user presses a key with a velocity that falls within a first range (e.g., a lower velocity range), and the channel strips of layer 1222 may be accessed when the user presses a key with a velocity that falls within a second range (e.g., a higher velocity range). In some embodiments, the media application may access a channel strip of a layer associated with a lower velocity in addition to or instead of a channel strip of a layer associated with a higher velocity in response to receiving a higher velocity input.

Figure 13:
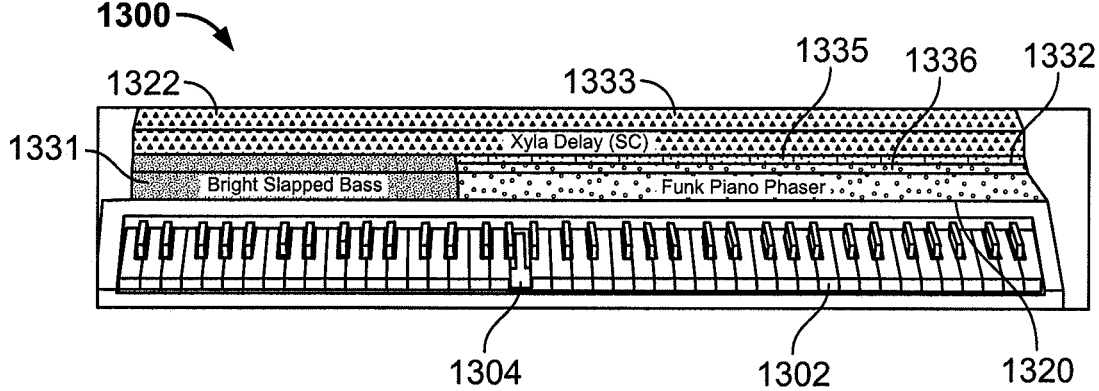
FIG. 13 is an illustrative display screen of several layers when a user provides an input at a first velocity in accordance with an embodiment of the invention.

The media application may provide a graphical representation of the layers accessed by the user using any suitable approach. In some embodiments, the media application may change the color of a displayed layer (e.g., layers 1220 and 1222) in response to accessing the displayed layer. FIG. 13 is an illustrative display screen of several layers when a user provides an input at a first velocity in accordance with an embodiment of the invention. Display screen 1300 may include instrument 1302, which may correspond to the input device used to provide data to the media application. In the example of FIG. 13, the input device may be a keyboard. Display screen 1300 may include layers 1320 and 1322, where layer 1320 may include channel strips 1331 and 1332, and layer 1322 may include channel strip 1333.

In response to receiving an input from the input device (e.g., in response to the user pressing a key of the keyboard), the media application may provide a graphical representation of the input. For example, the media application may depress keyboard key 1304 (or keys) that was pressed by the user on instrument 1302 (e.g., the keyboard key identified using MIDI data or other data identifying the particular input key). When several layers are available to the user, however, merely displaying depressed key 1304 may be insufficient to identify the accessed layer. In addition to displaying depressed key 1304, the media guidance application may change of the appearance of the channel strip or layer accessed in response to the user input. For example, each of channel strips 1331 and 1332 of layer 1320 may initially be displayed in a first color or pattern, for example a dull color (e.g., channel strip 1331 is dull green, and channel strip 1332 is dull yellow) which may change to a second color or pattern in response to receiving an input to access a channel strip. As shown in FIG. 13, channel strip 1332 may change from color 1335 to color 1336 (e.g., from dull yellow to bright yellow). For example, the media application may add light effects to give the appearance that the first color is lit. In some embodiments, the amount of the second color displayed may depend on the manner in which the user provided the input. For example, if a channel strip is accessed when inputs fall within a set velocity range (e.g., the user strikes a key with a velocity that falls within a velocity range), the amount of the second color displayed may be related to the position in the range of the input velocity (e.g., if the input is ⅓ from the bottom of the range, the media application may change the color for ⅓ of the channel strip or layer).

Figure 14:
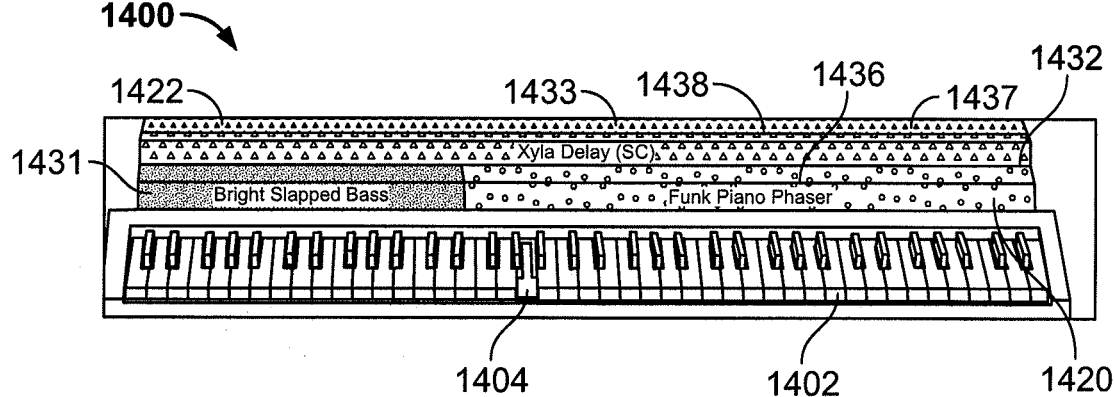
FIG. 14 is an illustrative display screen of the several layers of FIG. 13 when a user provides an input at a second velocity in accordance with an embodiment of the invention.

FIG. 14 is an illustrative display screen of the several layers of FIG. 13 when a user provides an input at a second velocity in accordance with an embodiment of the invention. Display screen 1400 may include instrument 1402, which may correspond to the input device used to provide data to the media application, and which may be the same as instrument 1302 (FIG. 13). In the example of FIG. 14, the input device may be a keyboard. Display screen 1400 may include layers 1420 and 1422, where layer 1420 may include channel strips 1431 and 1432, and layer 1422 may include channel strip 1433. Layers 1420 and 1422, and channel strips 1431, 1432 and 1433 may correspond to layers 1320 and 1322, and channel strips 1331, 1332 and 1333 of FIG. 13, respectively.

In response to receiving an input from the input device (e.g., in response to the user pressing a key of the keyboard), the media application may provide a graphical representation of the input, similar to the input shown in FIG. 13 (e.g., depressed keyboard key 1304). To indicate that a user has accessed layer 1422 (e.g., a layer accessible when the velocity of the input is in a velocity range that is higher than the velocity range for accessing layer 1420), the media application may change the color of layer 1422 from initial color 1437 to color 1438 (e.g., from dull blue to light blue). For example, the media application may add light effects to give the appearance that the first color is lit.

In some embodiments, the amount of the second color displayed may depend on the manner in which the user provided the input. For example, if a channel strip is enabled when inputs fall within a set velocity range (e.g., the user strikes a key with a velocity that falls within a range), the amount of the second color displayed may be related to the position in the range of the input velocity (e.g., if the input is 30% from the bottom of the range, the media application may change the color for 30% of the channel strip or layer). If the media application passes through a first layer to reach a second layer (e.g., passes through layer 1420 to reach layer 1422), the media application may change the color of the entire first layer before starting to change the color of the second layer (e.g., layer 1420 is in color 1436). Alternatively, the media application may leave the first layer in its initial color to indicate that the media application is not providing an output corresponding to a channel strip of the first layer.

The media application may use any suitable approach for providing outputs when the velocity of an input passes through several layers. For example, if the user provides an input at a velocity that falls within the velocity range of layer 1422, and thus exceeds the velocity range of layer 1420, the media application may or may not provide an output corresponding to channel strip 1432 of layer 1420. In some embodiments, the media application may simultaneously provide an output corresponding to channel strip 1432 of layer 1420 and channel strip 1433 of layer 1422. In some embodiments, the media application may instead skip channel strip 1432 of layer 1420 and only provide an output corresponding to channel strip 1433 of layer 1422. In some embodiments, the change of color of layers 1420 and 1422 may only occur if the channel strips of the layer are accessed to provide an audio output.

Figure 15:
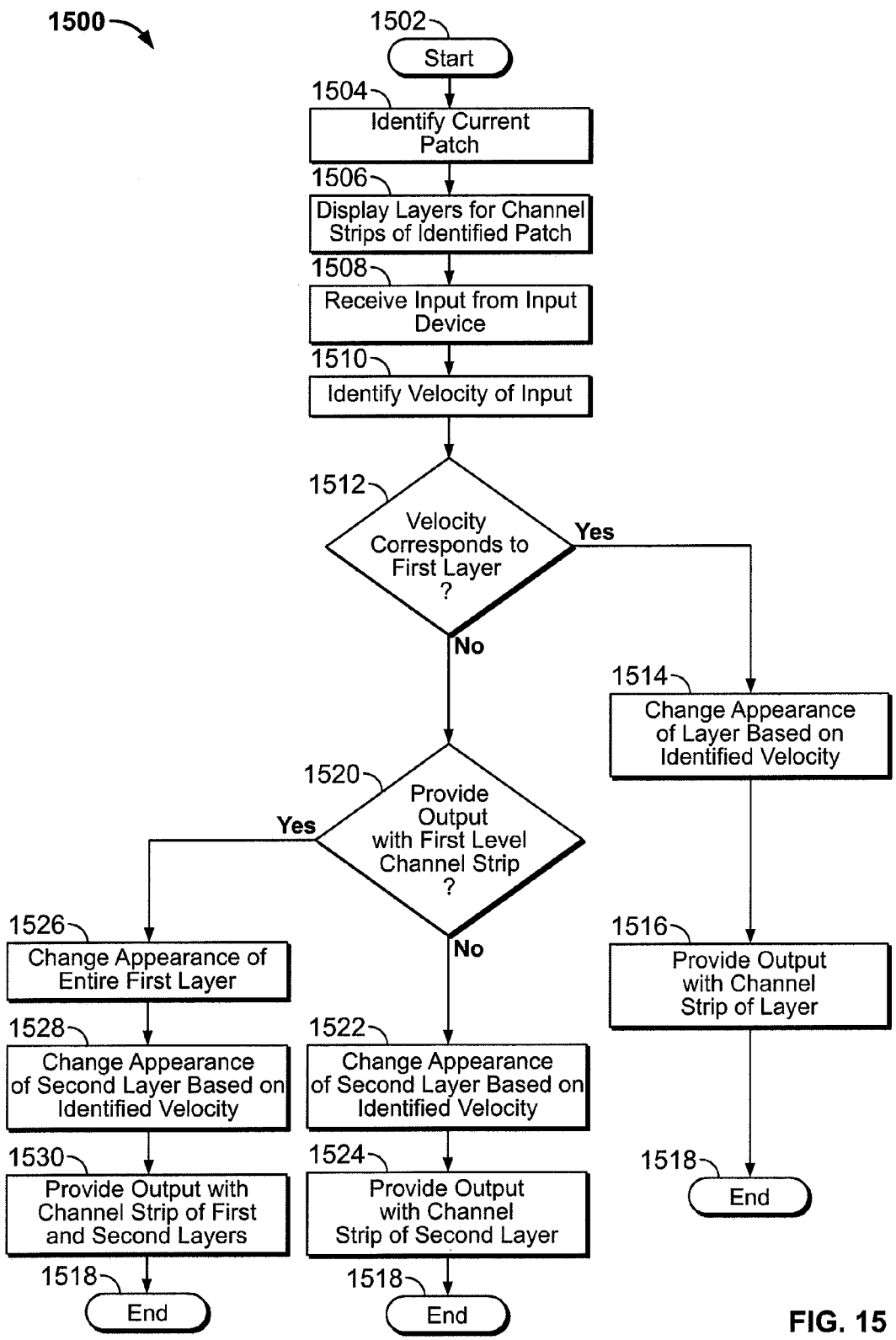
FIG. 15 is a flowchart of an illustrative process for providing a visual representation of an accessed layer in accordance with one embodiment of the invention.

FIG. 15 is a flowchart of an illustrative process for providing a visual representation of an accessed layer in accordance with one embodiment of the invention. Process 1500 may begin at step 1502. At step 1504, the media application may identify the currently selected patch. For example, the media application may identify the patch currently selected in patch list 802 (FIG. 8). In response to identifying the currently selected patch, the media application may identify the channel strips associated with the patch, and the layers in which the channel strips are placed. In some embodiments, the media application may identify the parameters allowing access to each layer (e.g., the range of input velocities associated with each layer or with the channel strips of each layer). At step 1506, the media application may display layers for the channel strips of the identified patch. For example, the media application determine which channel strips are associated with each layer based on the parameters set for each channel strip, and display the channel strips in the layers. The media application may display one or more channel strips in each layer.

At step 1508, the media application may receive an input from an input device. For example, the media application may receive an input from input device 106 (FIG. 1). The input be received using any suitable protocol, including for example an input from a musical instrument received as a MIDI signal. At step 1510, the media application may determine the velocity of the input. For example, the media application may determine, from the input or metadata provided with the input, the velocity of the input. In some embodiments, the media application may instead determine a measure of the strength of the input (e.g., the force used to provide the input or the tension applied to a string). For example, the media application may measure the loudness with which the user hit a key (e.g., a keyboard key).

At step 1512, the media application may determine whether the velocity of the input identified at step 1510 corresponds to a velocity of a first layer. For example, the media application may compare the input velocity identified at step 1510 with the range of velocities allowing access to the first layer. If the media application determines that the input velocity falls within the range of velocities associated with the first layer, process 1500 may move to step 1514. At step 1514, the media application may change the appearance of the first layer based on the identified velocity. For example, the media application may change the shading or color of the first layer in a manner that is related to the input velocity (e.g., proportional to the input velocity). At step 1516, the media application may provide an output using a channel strip of the first layer. For example, the media application may identify the channel strip output corresponding to the received input, and may provide the output to the user. Process 1500 may then end at step 1518.

If, at step 1512, the media application instead determines that the input velocity does not fall within the range of velocities associated with the first layer (e.g., the input velocity falls within the range of a second layer instead), process 1500 may move to step 1520. At step 1520, the media application may determine whether to provide an output using a channel strip of the first layer. For example, the media application may determine whether the velocity exceeded the velocity range of the first layer (e.g., the velocity passed through the velocity range of the first layer), and whether layers that were passed through are used to provide an output (e.g., whether the user has set a parameter directing the first layer to provide an output). If the media application determines that that the channel strip of the first layer is not used to provide an output, process 1500 may move to step 1522. At step 1522, the media application may change the appearance of a second layer based on the identified velocity. For example, the media application may change the shading or color of the second layer in a manner that is related to the input velocity (e.g., proportional to the input velocity). At step 1524, the media application may provide an output using a channel strip of the second layer. For example, the media application may identify the channel strip output corresponding to the received input, and may provide the output to the user. Process 1500 may then end at step 1518.

If, at step 1522, the media application instead determines that that the channel strip of the first layer is used to provide an output, process 1500 may move to step 1526. At step 1526, the media application may change the appearance of the entire first layer. For example, the media application may change the shading or color of the entire first layer (e.g., because the velocity is higher than the upper limit of the first layer velocity range). At step 1528, the media application may change the appearance of a second layer based on the identified velocity. For example, the media application may change the shading or color of the second layer in a manner that is related to the input velocity (e.g., proportional to the input velocity). At step 1530, the media application may provide an output using a channel strip of the second layer. For example, the media application may identify the channel strip output corresponding to the received input, and may provide the output to the user. Process 1500 may then end at step 1518.

In some embodiments, the user may set several channel strips in a single layer. For example, the user may define a layer that includes two channel strips. To separate the channel strips, the user may set a split between the channel strips, where the split may be defined as a particular input (e.g., a particular key or a MIDI number associated with a particular key). When the user may provide an input that is higher than the split, the media application may provide outputs using one of the channel strips (e.g., a drum pad), and when the user provides an input that is lower than the split, the media application provides outputs using the other channel strip (e.g., a keyboard). If the media application includes more than two channel strips in a given layer, the media application may define a key range for each channel strip, where the limits of the key ranges define the splits for each of the channel strips. Then, when a user provides an input, the media application may identify the key range into which the input falls, identify the channel strip associated with the identified key range, and provide an output using the identified channel strip.

In some embodiments, the input device may include a limited number of possible inputs (e.g., a keyboard with few octaves), and may therefore limit the inputs that the user can provide to each of the channel strips of a particular layer. To accommodate a larger key range for each of the channel strips, the media application may define a floating split separating the channel strips. The floating split may be operative to selectively extend each of the channel strips based on a number of criteria to allow the user to play a larger key range with each of the channel strips.

Figure 16:
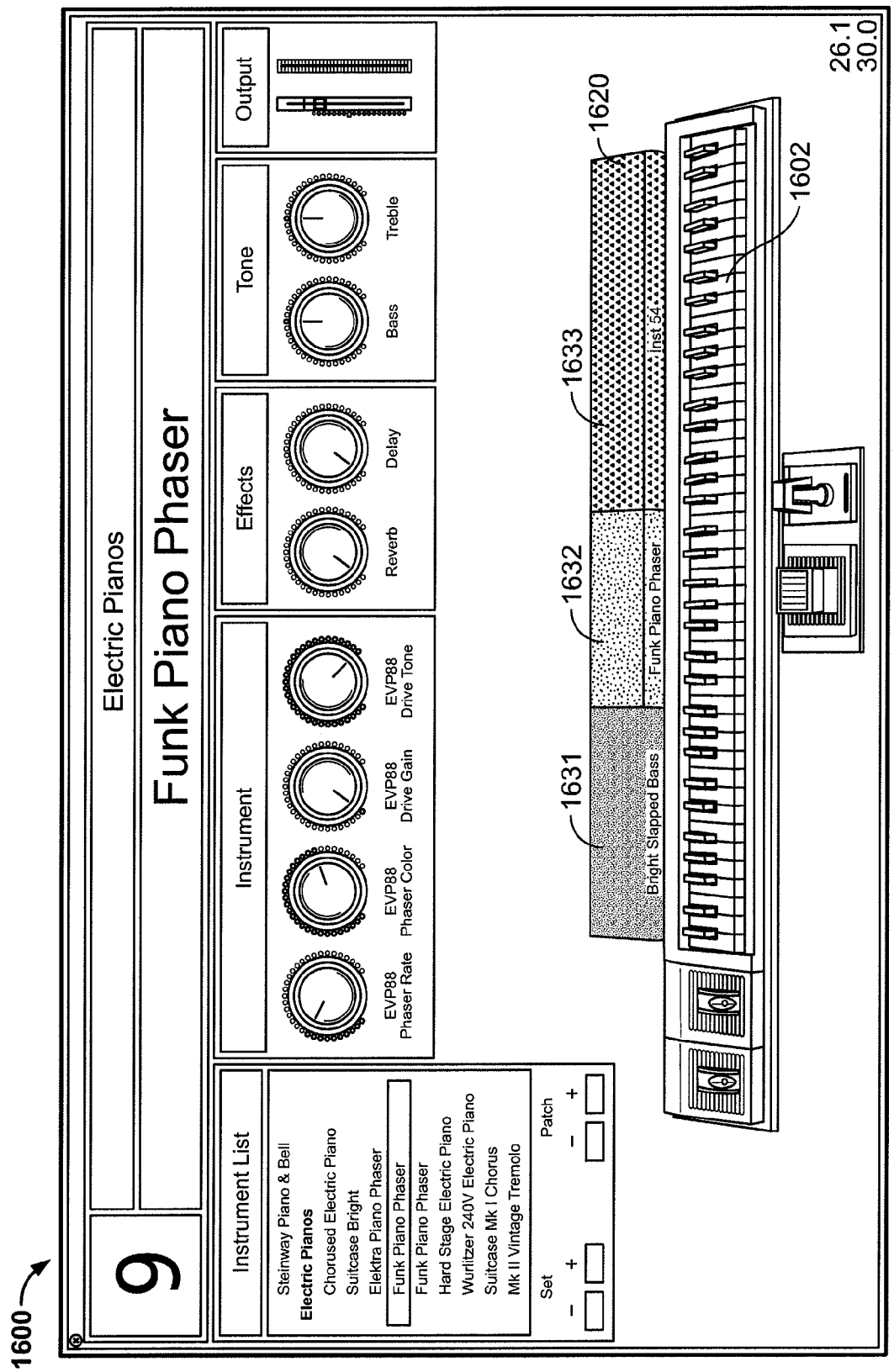
FIG. 16 is a schematic view of an illustrative display screen with several channel splits in a layer in accordance with one embodiment of the invention.

FIG. 16 is a schematic view of an illustrative display screen with several channel splits in a layer in accordance with one embodiment of the invention. Display screen 1600 may include instrument 1602 and layer 1620. Instrument 1602 may include any suitable instrument, including for example a keyboard. Layer 1620 may include several channel strips, each associated with different key ranges. For example, layer 1620 may include channel strip 1631 (e.g., entitled "Bright Slapped Bass"), channel strip 1632 (e.g., entitled "Funk Piano Phaser") and channel strip 1633 (e.g., entitled "Inst 54"). The limit between each of channel strips 1631 and 1632, and 1632 and 1633 may be defined by a floating split. For example, the user may define the key range associated with each of the channel strips (e.g., by defining the high key and low key of the channel strip), and may define the number of keys beyond the high or low key the channel strip may extend.

Figure 17:
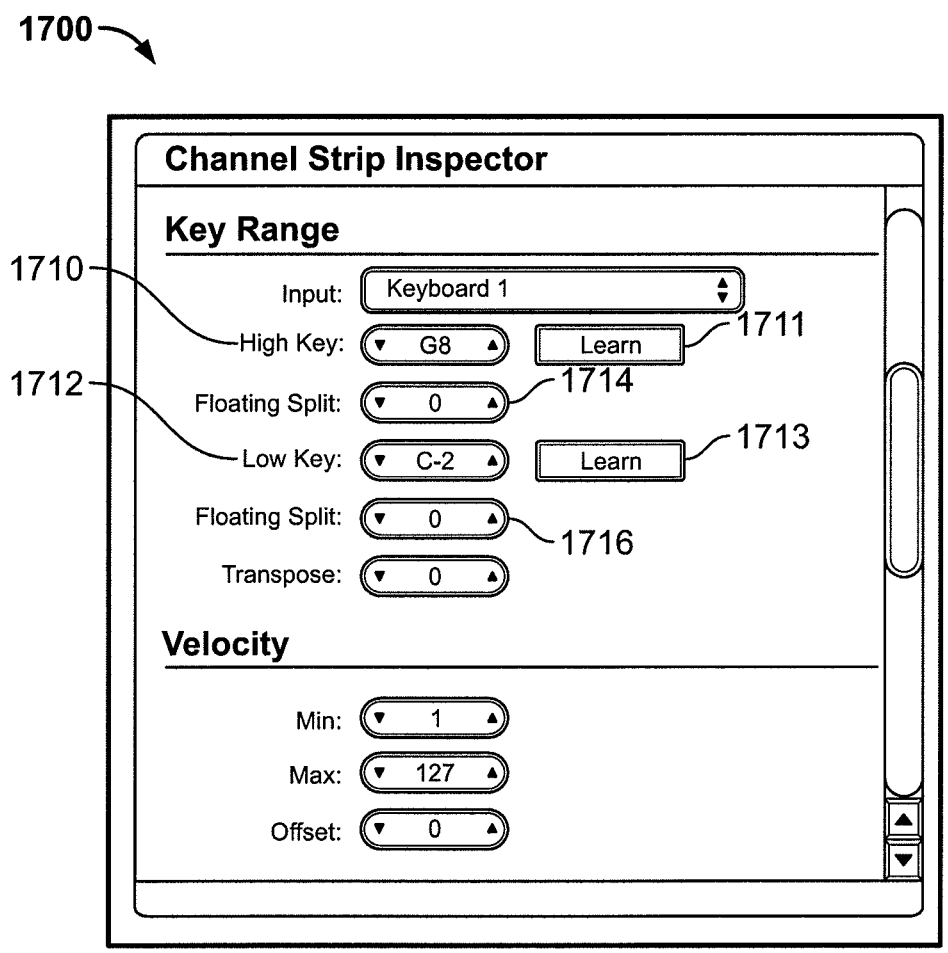
FIG. 17 is an illustrative display of a channel strip inspector in accordance with one embodiment of the invention.

The user may define the key range and floating split for each channel strip using any suitable approach. In some embodiments, the user may set the key range and floating split as parameters of each channel strip, for example using a channel strip inspector (e.g., displayed instead of screen control inspector 840, FIG. 8). FIG. 17 is an illustrative display of a channel strip inspector in accordance with one embodiment of the invention. Channel strip inspector 1700 may be used to set parameters for several channel strips. The user may set the high key of the channel strip key range using value slider 1710 (e.g., G8 in FIG. 17), and the low key using value slider 1712 (e.g., C-2 in FIG. 17). In some embodiments, the user may select one of learn options 1711 and 1713 (e.g., displaying a highlight region on one of learn options 1711 and 1713), and provide an input with the input device (e.g., press a key of the keyboard) to set the high or low key of the channel strip. The media application may prevent the user from setting a high key that is lower than the set low key, or may automatically transpose the high and low keys so that the key set using value slider 1710 may be higher than the key set using value slider 1712.

The user may set a floating split for each of the high key and the low key of the selected channel strip using any suitable approach. In some embodiments, the user may set the floating split for the high key using value slider 1714, and the floating split for the low key using value slider 1716. The value set for each floating split may include an integer defining the number of notes or half notes beyond the set high key or low key that the user can extend the key range as he plays the channel strip. In some embodiments, the floating split may include a note beyond the high key or low key to which the channel strip may extend.

Figure 18A:
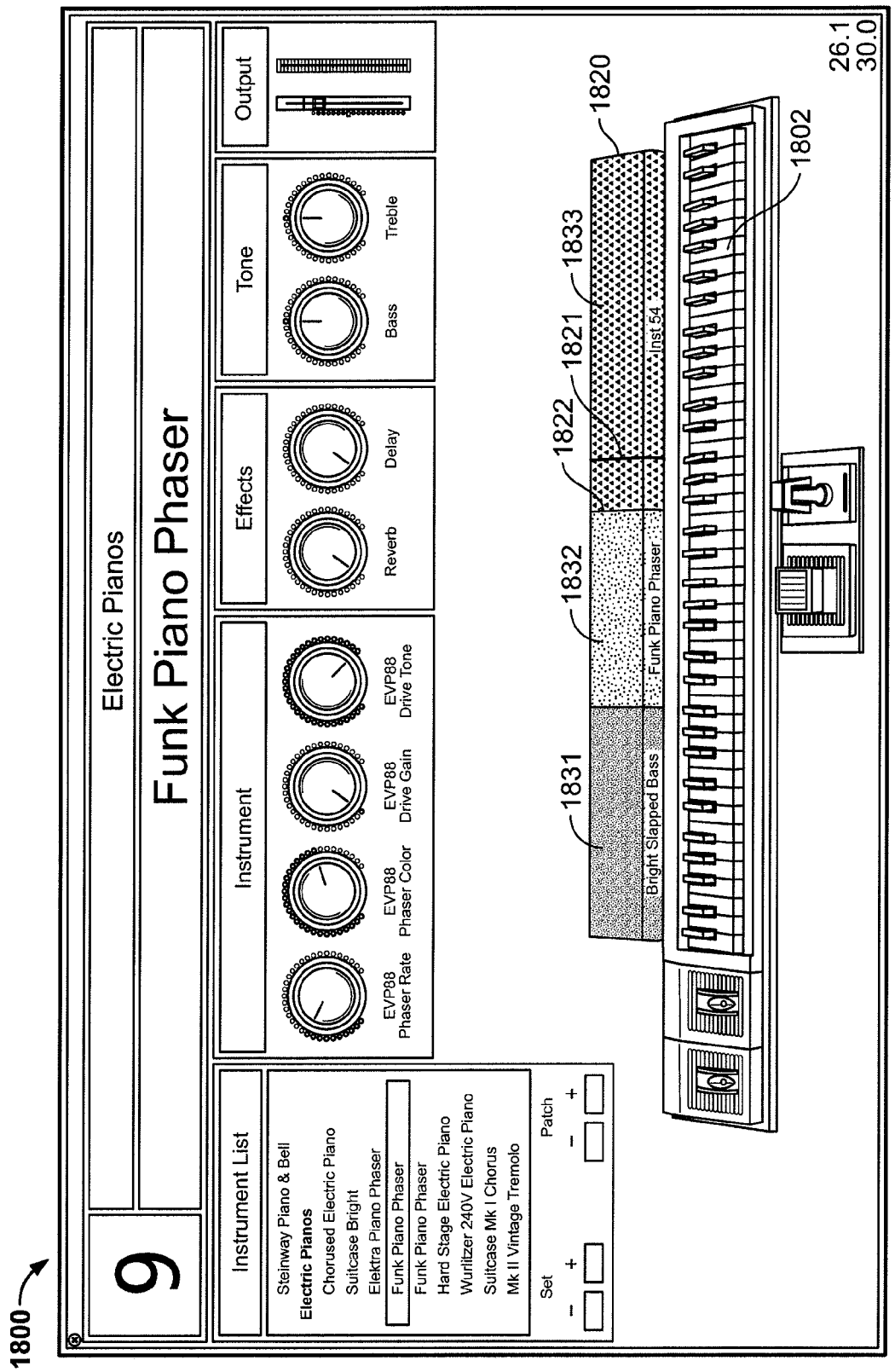
FIG. 18A is a schematic view of the illustrative display screen of FIG. 16 when the floating split between the channel strips moves in accordance with one embodiment of the invention.

When the user plays within the key range of a channel strip, the media application may provide an output using the channel strip. As the user moves towards the high or low key of the channel strip, the media application may selectively extend the key range of the channel strip up to the limit defined by the floating split (e.g., an extra five notes are allowed beyond the high or low key). FIG. 18A is a schematic view of the illustrative display screen of FIG. 16 when the floating split between the channel strips moves in accordance with one embodiment of the invention. FIG. 18A may include instrument 1802, which may be the same as instrument 1602 (FIG. 16), and layer 1820, which may include the same channel strips as layer 1620 (FIG. 16). For example, channel strips 1831, 1832 and 1833 may be the same as channel strips 1631, 1632 and 1633. As the user plays channel strip 1833 and moves beyond the initial low key associated with channel strip 1833, the media application may extend the key range of channel strip 1833 from its initial lower limit 1821 to extended lower limit 1822, and simultaneously reduce the key range of channel strip 1832 to accommodate for the additional keys taken by channel strip 1833. The media application may visually represent the flexible split between the channel strips by expanding and contracting the amount of layer 1820 allocated to each of channel strips 1831, 1832 and 1833.

The media application may display extended lower limit 1822 using any suitable approach. For example, so long as the user does not exceed the additional range allowed by the floating split, the media application may move extended lower limit 1822 (and expand and contract channel strips 1832 and 1833) to match the current input provided by the user (e.g., the current key entered by the user). As another example, the media application may move extended lower limit 1822 to the end of the range allowed by the floating split (e.g., maximizing the lower key range associated with channel strip 1833) as soon as the user moves past initial lower limit 1821. When the user moves beyond the end of the range allowed by the floating split, or when the user returns to the initial key range of the channel strip (e.g., moves higher than initial lower limit 1821), the media application may return the floating split to its initial position (e.g., return floating split to initial lower limit 1821).

Figures 18B, 18C:
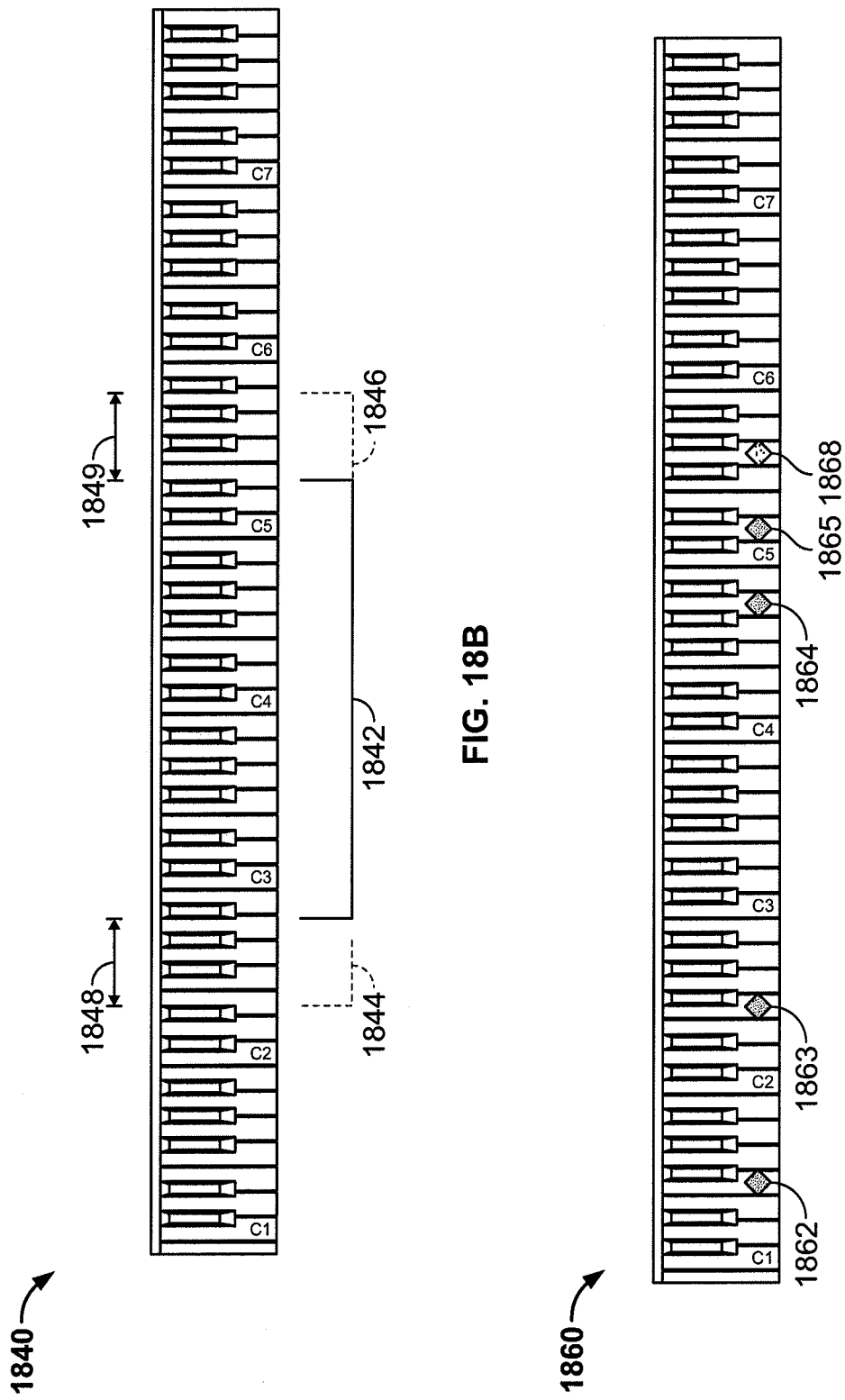
FIG. 18B is a schematic view of a flexible key range defined by a floating split point applied to a keyboard in accordance with one embodiment of the invention.
FIG. 18C is a schematic view of a keyboard to which a flexible key range is applied in accordance with one embodiment of the invention.

FIG. 18B is a schematic view of a flexible key range defined by a floating split point applied to a keyboard in accordance with one embodiment of the invention. The user may define initial key range 1842 for a particular channel strip. Initial key range 1842 may be defined by two notes, a user low note limit (e.g., C3), and a user high note limit (e.g., C5). The user high and low note limits may be defined using any suitable approach, including for example a number associated with each note (e.g., a MIDI note number). The user may also define lower extended key range 1844, and higher extended key range 1846. Each of the lower and higher extended key ranges may be defined, for example, by a number representing the number of notes beyond the defined low and high note limits, respectively, that the key range can flexibly extend. As the user plays keyboard 1840, the media application may determine, based on factors described below, whether to extend the flexible key range to include the additional notes identified by arrows 1848 and 1849.

The media application may use any suitable criteria to determine whether to move a floating split point and to extend the key range of a channel strip. For example, the media application may attempt to minimize changes of channel strips as the user plays to minimize the user's confusion. In some embodiments, the media application may consider the parameters set by the user, such as the high and low keys set for a channel strip, and the floating splits for each end of the key range. For example, the media application may determine whether an input by the user exceeds the maximum range set by the floating split (e.g., the floating split allows up to 3 notes beyond an upper or lower limit, and the user has moved 5 notes beyond the limit).

In some embodiments, the media application may consider the maximal expected note jump. For example, if the user jumps a large number of notes, starting from within an initial key range of a channel strip, and ending within the extended portion of the key range (e.g., ending in the additional notes defining the floating split), the media application may determine that the jump is too large to expect that the user intended to remain in the same channel strip, and may use another channel strip for the second input. The media application may use any suitable value for the maximum note jump, including for example one octave.

In some embodiments, the media application may consider the one or more currently played notes and currently pressed notes. FIG. 18C is a schematic view of a keyboard to which a flexible key range is applied in accordance with one embodiment of the invention. As the user sequentially presses keys on keyboard 1860, the media application may keep track of the prior played notes 1862, 2863, 1864 and 1865 (e.g., as held notes). Then, when the user presses a key that is beyond the initial key range of the selected channel strip, but still within the extended key range (e.g., note 1868), the media application may determine, based in part on prior notes 1862, 1863, 1864 and 1865, whether to extend the flexible key range. For example, the media application may identify the currently played note (e.g., the note associated with a note-on tag, for example a "MIDI Note On" tag). As another example, the media application may identify currently pressed notes that were previously pressed, but not yet released, such as when the user presses a key on a keyboard but has not yet released the key (e.g., the media application has not received a note-off tag, for example a "MIDI Note Off" tag). If the media application determines that the currently played notes or currently pressed notes are within a given range of the floating split, the media application may extend the key range of the channel strip to include the floating split.

In some embodiments, the media application may consider the amount of time after a key producing a note has been released. For example, the media application may determine that if the user has released a key within the key range of a channel strip for a minimum amount of time, and subsequently presses a key that corresponds to the extended portion of the key range (e.g., a key that falls within the range of the floating split), the media application may infer that the user intended to change channel strips. The minimum amount of time may be any suitable amount of time. For example, the minimum amount of time may be 1 second, ½ second, or any other measure of absolute time. As another example, the minimum amount of time may be related to the tempo set for the concert, patch or channel strip. The minimum amount of time may include, for example, one or more beats.

In some embodiments, the media application may consider the history of all played notes (e.g., and thus user inputs). For example, the media application may determine that the user has played primarily using a particular channel strip, and may therefore extend the channel strip to limit the number of channel strip changes. As another example, the media application may recognize patterns of notes played by the user, and may maintain the channel strip when the user repeats the pattern farther up or down in the key range. As still another example, the media application may compare the notes played by the user with a database of common key progressions or chords and known songs, and extend the key range of a channel strip upon determining that the user is playing a known key progression.

Figure 19A:
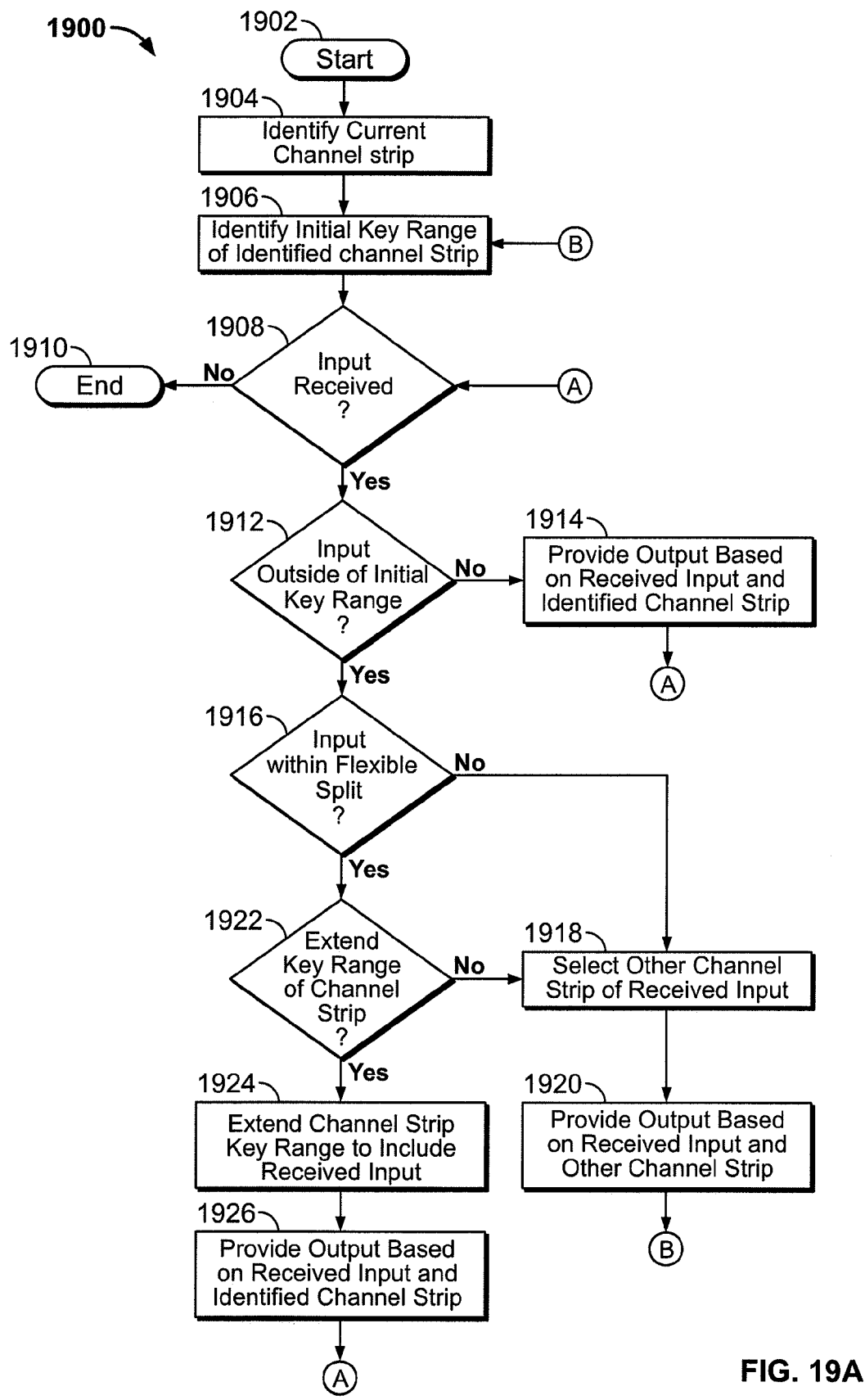
FIG. 19A is a flowchart of an illustrative process for extending the key range of a channel strip using a floating split in accordance with one embodiment of the invention.

FIG. 19A is a flowchart of an illustrative process for extending the key range of a channel strip using a floating split in accordance with one embodiment of the invention. It will be understood that the order of the steps of this and other flowcharts described herein is merely illustrative, and any suitable order of steps may be used. Process 1900 may begin at step 1902. A step 1904, the media application may identify the current channel strip. For example, the media application may identify the channel strip associated with the last input received from the input device (e.g., input device 106, FIG. 1). At step 1906, the media application may identify the initial key range of the identified channel strip. For example, the media application may identify, from the parameters set for the channels trip, the high and low keys associated with the channel strip. As another example, the media application may identify the current high and low keys (e.g., including floating splits if currently used). In some embodiments, the media application may also determine whether the channel strip includes a floating split, and the amount by which the floating split extends the key range of the identified channel strip.

At step 1908, the media application may determine whether an input is received. For example, the media application may determine whether the user has provided an input using input device 106 (e.g., pressed a key on a keyboard to provide a MIDI note). If the media application determines that no input has been received, process 1900 may move to step 1910 and end. If, at step 1908, the media application instead determines that an input has been received, process 1900 may move to step 1912.

At step 1912, the media application may determine whether the received input is outside of the initial key range of the identified channel strip (e.g., identified at step 1906). For example, the media application may compare the received input (e.g., the MIDI data identifying the note) with the key range of the channel strip. If the media application determines that the received input falls within the initial key range of the identified channel strip, process 1900 may move to step 1914. At step 1914, the media application may provide an output based on the received input and on the identified channel strip. For example, the media application may provide an output that includes the note input by the user to which the effects of the channel strip identified at step 1904 are applied (e.g., which instrument to resemble, fade or volume). Process 1900 may then return to step 1908 to await the next input received from the input device.

If, at step 1912, the media application instead determines that the input is outside of the initial key range of the identified channel strip, process 1900 may move to step 1916. At step 1916, the media application may determine whether the received input is within the flexible split region of the key range. For example, the media application may determine whether the received input is within the amount of additional notes or keys by which the channel strip may be extended (e.g., within the amounts of floating splits 1714 or 1716). As another example, the media application may determine whether the current channel strip even has a floating split at all. If the media application determines that the received input is not within the flexible split region of the key range, process 1900 may move to step 1918.

At step 1918, the media application may select the channel strip having a key range that includes the received input. For example, the media application may compare the received input with the key ranges of the other channel strips available in the patch or layer, and select the channel strip with which the received input is associated. At step 1920, the media application may provide an output based on the received input and on the other channel strip. For example, the media application may provide an output that includes the note input by the user to which the effects of the other channel strip identified at step 1918 are applied (e.g., which instrument to resemble, fade or volume). Process 1900 may then return to step 1906 to identify the initial key range of the other channel strip.

If, at step 1916, the media application instead determines that the received input is within the flexible split region of the key range, process 1900 may move to step 1922. At step 1922, the media application may determine whether to extend the key range of the current channel strip. For example, the media application may infer, based on the previous inputs received from the input device, whether the user intends to remain in the same channel strip or to change channel strips. If the media application determines not to extend the key range of the current channel strip, process 1900 may move to step 1918, described above.

If, at step 1922, the media application instead determines to extend the key range of the current channel strip, process 1900 may move to step 1924. At step 1924, the media application may extend the key range of the channel strip to include the received input. For example, the media application may associate all inputs between the received input and the initial channel strip key range high or low key with the identified channel strip. In some embodiments, the media application may update a graphical display of the key range of the channel strip (e.g., channel strips displayed simultaneously in the same layer) to indicate that the identified channel strip has been expanded, and that another channel strip has been reduced. At step 1926, the media application may provide an output based on the received input and on the identified channel strip. For example, the media application may provide an output that includes the note input by the user to which the effects of the channel strip identified at step 1904 are applied (e.g., which instrument to resemble, fade or volume). Process 1900 may then return to step 1908 to await the next input received from the input device.

Figure 19B:
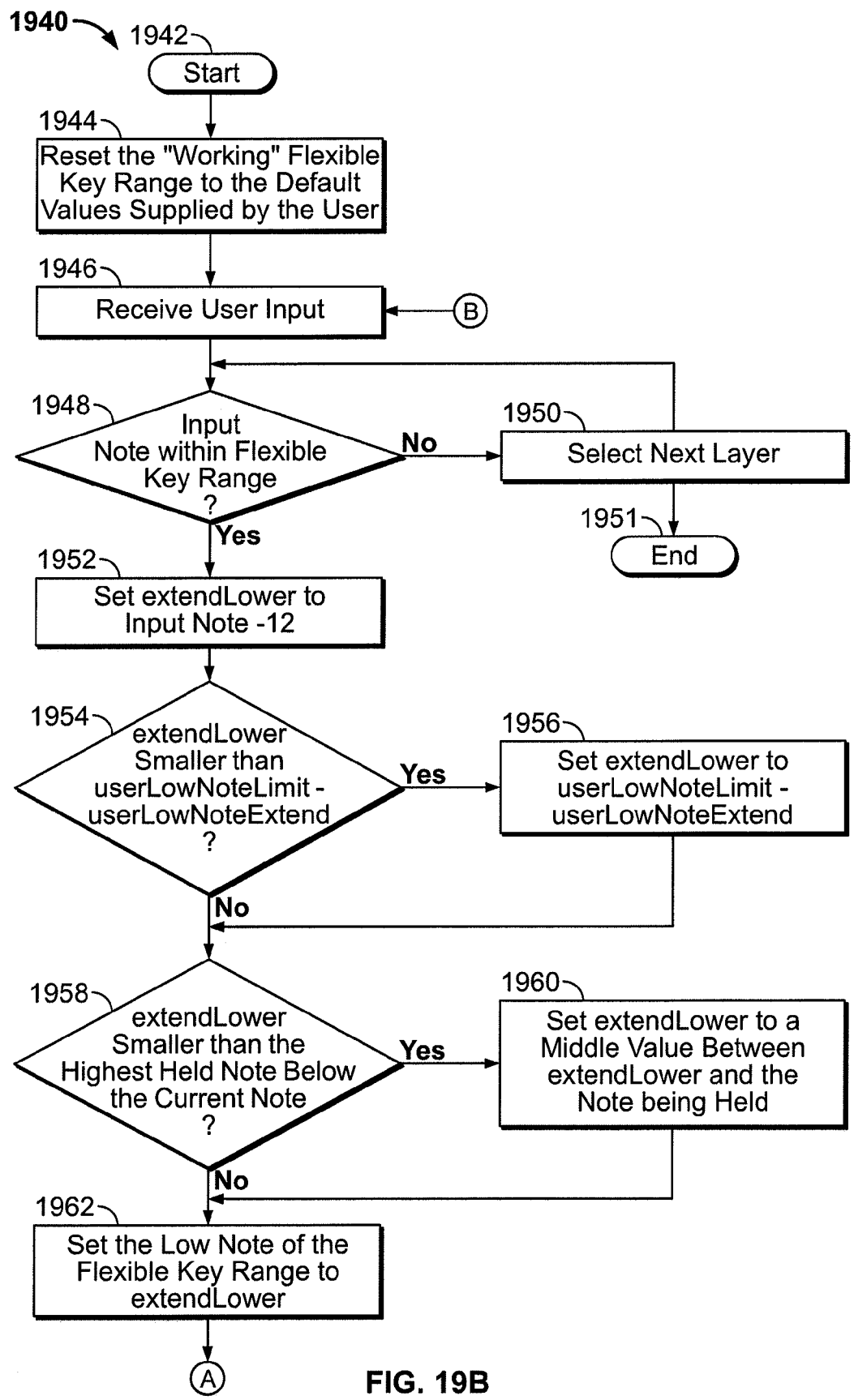
FIG. 19B is a flowchart of another illustrative process for setting the key range of a channel strip using a floating split in accordance with one embodiment of the invention.

FIG. 19B is a flowchart of another illustrative process for setting the key range of a channel strip using a floating split in accordance with one embodiment of the invention. Process 1940 may begin at step 1942. At step 1944, the media application may reset the working flexible key range of the currently selected channel strip to the default values provided by the user. For example, the media application may set the low and high note limits for the key range (e.g., variables userLowNoteLimit and userHighNoteLimit), and the number of notes beyond the low and high limits that the key range may be extended (e.g., variables userLowNoteExtend and userHighNoteExtend) to the values set in a channel strip inspector (e.g., channel strip inspector 1700, FIG. 17). At step 1946, the media application may receive a user input. For example, the media application may receive a note from a keyboard coupled to the media application.

At step 1948, the media application may determine whether the note is within the flexible key range set at step 1944. For example, the media application may compare the received note with the upper and lower limits of the working flexible key range. If the media application determines that the received note is not within the working flexible key range, process 1940 may move to step 1950 where the next layer (e.g., the next channel strip having a different key range) may be selected. Process 1940 may then end at step 1951, or return to step 1944 and reset a new working flexible key range that is associated with the next layer.

If, at step 1948, the media application instead determines that received note is within the working flexible key range, process 1940 may move to step 1952. At step 1952, the media application may set the variable extendLower to be the value of the input note to which 12 is subtracted. extendLower may be a variable defining a lower limit for a key range based on the received note, and 12 may be any suitable number. For example, the number 12 may be selected because there are 12 notes in an octave. At step 1954, the media application may compare the value of extendLower and the value of the lowest note of the flexible key range (e.g., userLowNoteLimit−userLowNoteExtend). If the media application determines that the value of the lowest note of the flexible key range is higher than the value of extendLower, process 1940 may move to step 1956. At step 1956, the media application may reset the value of variable extendLower to the value of the lowest note of the flexible key range (e.g., userLowNoteLimit−userLowNoteExtend). Process 1940 may then move to step 1958.

If, at step 1954, the media application instead determines that the value of the value of extendLower is higher than the lowest note of the flexible key range, process 1940 may move to step 1958. At step 1958, the media application may compare the value of extendLower (e.g., the input note−12) with the value of the highest held note below the input note (e.g., the note received at step 1946). For example, if the received note was played by a keyboard user's right hand, the media application may determine whether the value of the note one octave below the received note (e.g., input note−12) is smaller than the value of the highest note that was played by the user's left hand (e.g., which would presumably have a lower value than notes played with the user's right hand). If the media application determines that the value of extendLower (e.g., the input note−12) is smaller than the value the highest held note below the input note, process 1940 may move to step 1960. At step 1960, the media application may set the value of variable extendLower to a middle value between the previous value of extendLower and the highest held note below the current note. Process 1940 may then move to step 1962.

If, at step 1958, the media application instead determines that the value of extendLower is higher than the value the highest held note below the input note, process 1940 may move to step 1962. At step 1962, the media application may set the low note of the flexible key range to the value of extendLower. At step 1964, the media application may set the variable extendHigher to be the value of the input note to which 12 is added. extendHigher may be a variable defining an upper limit for a key range based on the received note, and 12 may be any suitable number. For example, the number 12 may be selected because there are 12 notes in an octave. At step 1966, the media application may compare the value of extendHigher and the value of the highest note of the flexible key range (e.g., userHighNoteLimit+userHighNoteExtend). If the media application determines that the value of the highest note of the flexible key range is lower than the value of extendHigher, process 1940 may move to step 1968. At step 1968, the media application may reset the value of variable extendHigher to the value of the highest note of the flexible key range (e.g., userHighNoteLimit+userHighNoteExtend). Process 1940 may then move to step 1970.

If, at step 1966, the media application instead determines that the value of the value of extendHigher is lower than the highest note of the flexible key range, process 1940 may move to step 1970. At step 1970, the media application may compare the value of extendHigher (e.g., the input note+12) with the value of the lowest held note above the input note (e.g., the note received at step 1946). For example, if the received note was played by a keyboard user's left hand, the media application may determine whether the value of the note one octave above the received note (e.g., input note+12) is higher than the value of the lowest note that was played by the user's right hand (e.g., which would presumably have a higher value than notes played with the user's left hand). If the media application determines that the value of extendHigher (e.g., the input note+12) is higher than the value the lowest held note above the input note, process 1940 may move to step 1972. At step 1972, the media application may set the value of variable extendHigher to a middle value between the previous value of extendHigher and the lowest held note above the current note. Process 1940 may then move to step 1974.

If, at step 1970, the media application instead determines that the value of extendHigher is lower than the value the lowest held note above the input note, process 1940 may move to step 1974. At step 1974, the media application may set the high note of the flexible key range to the value of extendHigher. Process 1940 may then return to step 1946 to receive another input from the user (e.g., another note from a keyboard coupled to the media application).

Figure 20:
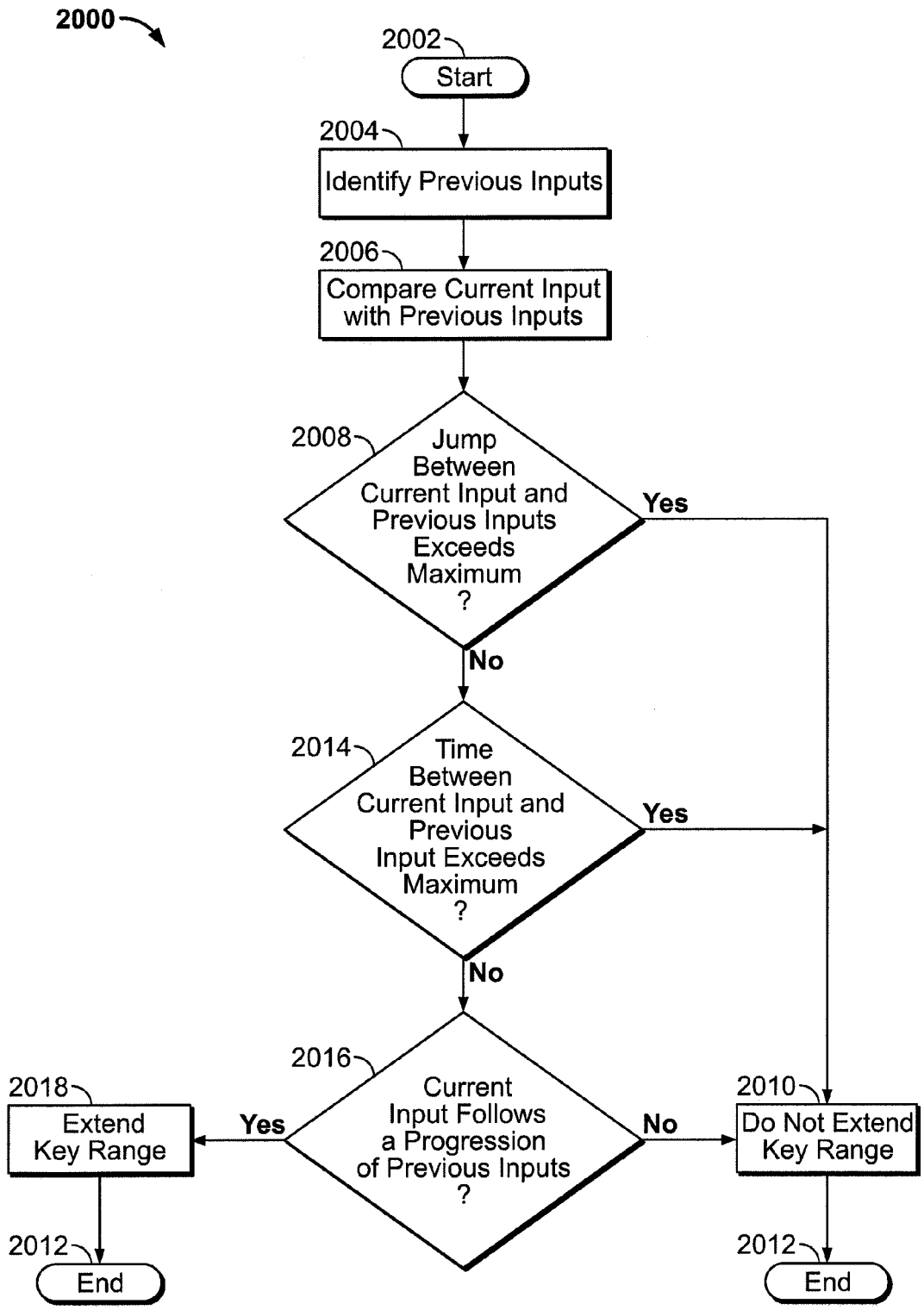
FIG. 20 is a flowchart of an illustrative process for determining whether to extend the key range of a channel strip in accordance with one embodiment of the invention.

FIG. 20 is a flowchart of an illustrative process for determining whether to extend the key range of a channel strip in accordance with one embodiment of the invention. In some embodiments, process 2000 may correspond to step 1922 of process 1900 (FIG. 19A). Process 2000 may begin at step 2002. At step 2004, the media application may identify the previous inputs received from the input device. For example, the media application may identify the notes corresponding to the previous inputs received from input device 106 (FIG. 1). In some embodiments, the media application may identify all of the previous inputs, a particular number of previous inputs (e.g., the last ten inputs), the previous inputs received over a particular time period (e.g., the inputs received in the last 15 seconds), or any other suitable amount of previous inputs. In some embodiments, the media application may identify, from the previous inputs, a progression of notes (e.g., inputs are decreasing notes) or a known pattern (e.g., inputs are those of a particular song).

Figure 19B:
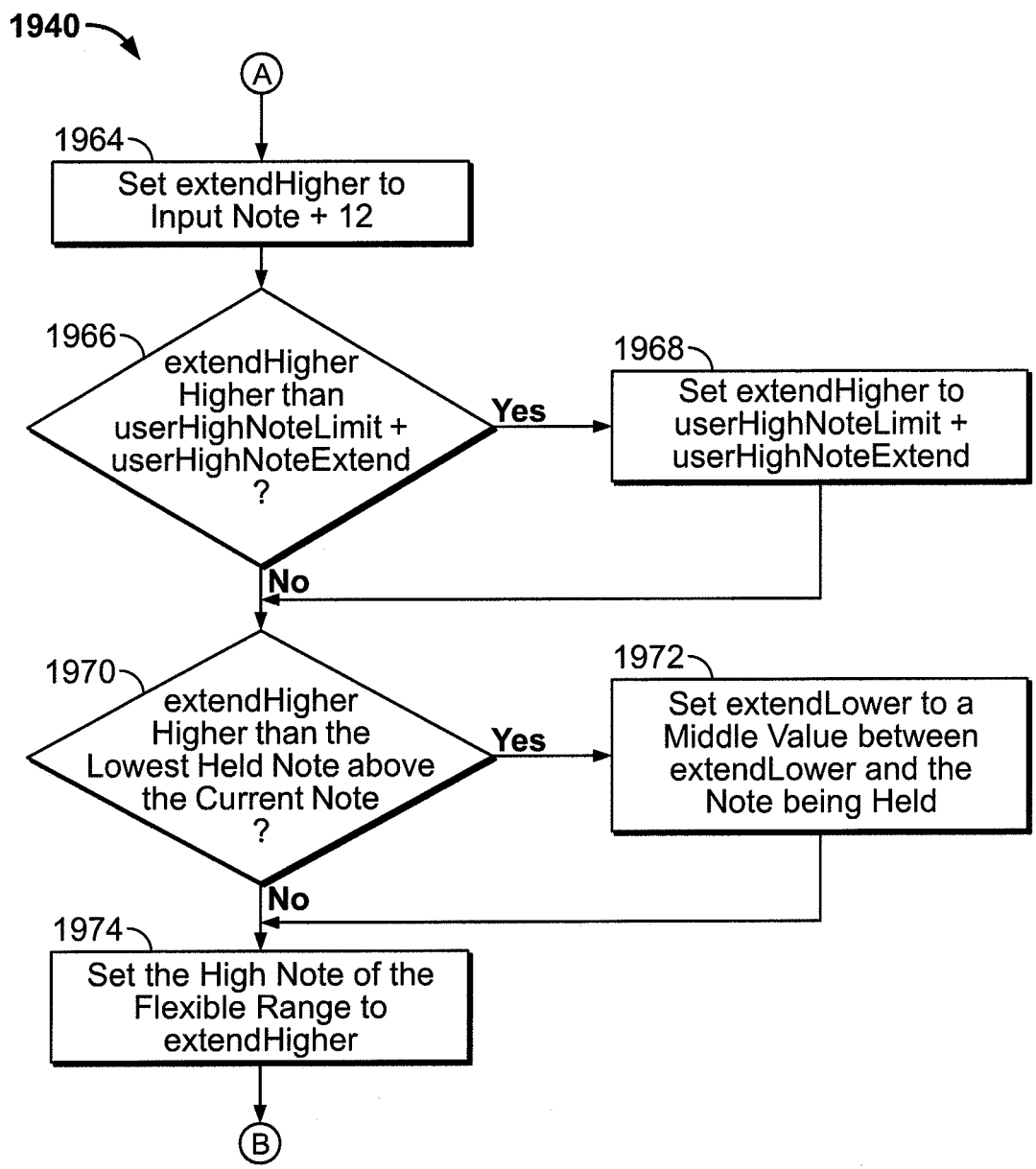

At step 2006, the media application may compare the current input with the previous inputs identified at step 2004. For example, the media application may compare a current input received at step 1908 of process 1900 (FIG. 19) with the previous inputs. In some embodiments, the media application may determine the relationship between the current input and the previous inputs (e.g., the next note in a progression of notes, the next note in a song, or an unrelated note). At step 2008, the media application may determine whether the jump between the current input and the previous inputs exceeds a maximum allowed jump. For example, the media application may determine whether the number of notes between the last or one of the previously played notes exceeds a maximum limit (e.g., one octave). If the media application determines that the jump between the current input and the previous inputs exceeds a maximum allowed jump, process 2000 may move to step 2010. At step 2010, the media application may not extend the key range of the channel strip. For example, the media application may provide an output corresponding to the received input using another channel strip. Process 2000 may then end at step 2012.

If, at step 2010, the media application instead determines that the jump between the current input and the previous inputs does not exceed a maximum allowed jump, process 2000 may move to step 2014. At step 2014, the media application may determine whether the time between the current input and the previous inputs exceeds a maximum allowed time. For example, the media application may determine whether the time elapsed between the last input and the current input exceeds an absolute amount of time (e.g., 1 second), a number of beats (e.g., 8 beats), or any other suitable measure of time. In some embodiments, the media application may compare the time lapsed between previous inputs with the time lapsed between the last input and the current input. For example, the media application may determine whether the lapsed time between the current input and last input is substantially longer than the time lapsed between the between previous inputs. If the media application determines that the time between the current input and the previous inputs exceeds a maximum allowed time, process 2000 may move to step 2010, described above.

If, at step 2014, the media application instead determines that the time between the current input and the previous inputs does not exceed a maximum allowed time, process 2000 may move to step 2016. At step 2016, the media application may determine whether the current input follows a progression of previous inputs. For example, the media application may determine whether the note of the current input is the next in a simple progression of notes (e.g., notes going down). As another example, the media application may determine whether the input is the next step of a chord, note, or key progression. As still another example, the media application may determine whether the input is the next step of a known musical piece (e.g., the next note or chord in a song). The media application may use any suitable knowledge of music and common sounds to determine whether the current input follows the previous inputs (e.g., the media application may know that a sharp rarely follows a particular note). In some embodiments, the media application may account for playing mistakes by the user (e.g., by reducing the tolerance for matching the progression of inputs to known progressions or songs). If the media application determines that the current input does not follow a progression of previous inputs, process 2000 may move to step 2010, described above.

If, at step 2016, the media application instead determines that the current input follows a progression of previous inputs, process 2000 may move to step 2018. At step 2018, the media application may extend the key range of the current channel strip. For example, the media application may modify the key range of the current channel strip to include the current input. In some embodiments, the media application may update a graphical display of the key range of the channel strip (e.g., channel strips displayed simultaneously in the same layer) to indicate that the identified channel strip has been expanded, and that another channel strip has been reduced. Process 2000 may then end at step 2012.

In some embodiments, the user of the media application may change patches during a performance. For example, the user may change patches during a solo (e.g., change the guitar patch during a guitar solo). As another example, the user may change patches when playing a new song. To avoid an abrupt change in the sound output by the media application, the media application may continue to play the patch even after a new patch has been selected. For example, a previously selected patch may continue to survive until the user closes the patch. As another example, if the patch has a resonate effect, the patch may continue to resonate after a new patch has been selected. As still another example, the media application may progressively fade out a patch and fade in a new patch in response to selecting the new patch. As still yet another example, the media application may maintain the patch's sound after a new patch has been selected for a particular amount of time (e.g., a number of seconds or minutes, a number of beats, or a number of inputs received).

Figure 21:
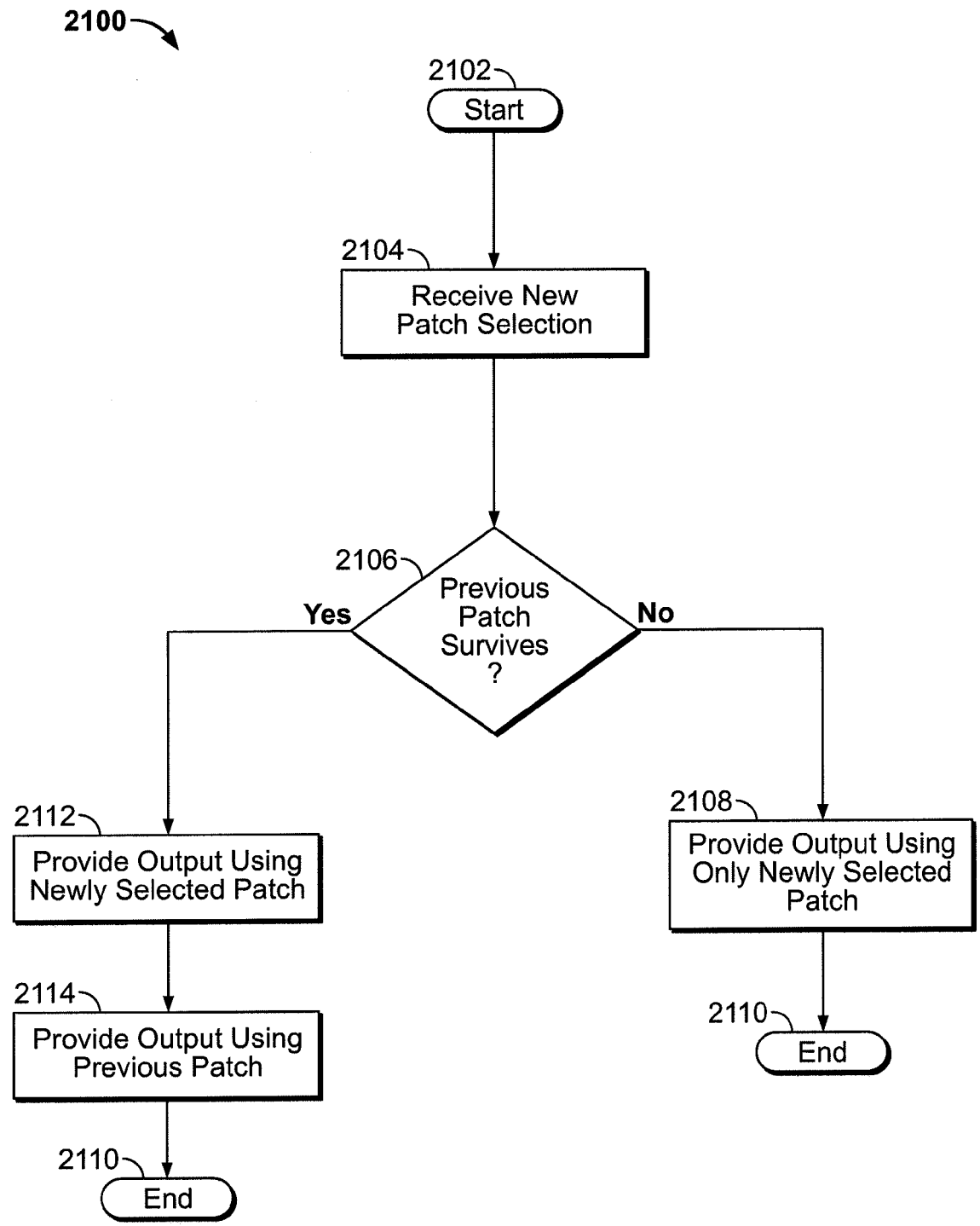
FIG. 21 is a flowchart of an illustrative process for maintaining a patch sound after a new patch is selected in accordance with one embodiment of the invention.

FIG. 21 is a flowchart of an illustrative process for maintaining a patch sound after a new patch is selected in accordance with one embodiment of the invention. Process 2100 may begin at step 2102. At step 2104, the media may receive a new patch selection. For example, the media application may receive a user selection of a patch (e.g., using patch list 802, FIG. 8). At step 2106, the media application may determine whether the previous patch survives. For example, the media application may determine whether the patch has a resonate parameter. As another example, the media application may determine whether the user has set a parameter to fade out the previous patch, or to extend the duration of the previous patch after a new patch has been selected. If the media application determines that the patch does not survive, process 2100 may move to step 2108. At step 2108, the media application may provide an output using only the newly selected patch. For example, the media application may provide an output that includes the user's input to which the effects of the newly selected patch are applied (e.g., which instrument to resemble, fade or volume). Process 2100 may then move to step 2110 and end.

If, at step 2106, the media application instead determines that the patch survives, process 2100 may move to step 2112. At step 2112, the media application may provide an output using the newly selected patch. For example, the media application may provide an output that includes the user's input to which the effects of the newly selected patch are applied (e.g., which instrument to resemble, fade or volume). At step 2114, the media application may provide an output using the previous patch. For example, the media application may simultaneously provide the outputs of the newly selected and previously selected patches. As another example, the media application may fade the previous patch (e.g., progressively reduce the output of the previous patch over a period of time such as, for example five seconds, or 10 beats). Process 2100 may then end at step 2110.

Figure 22:
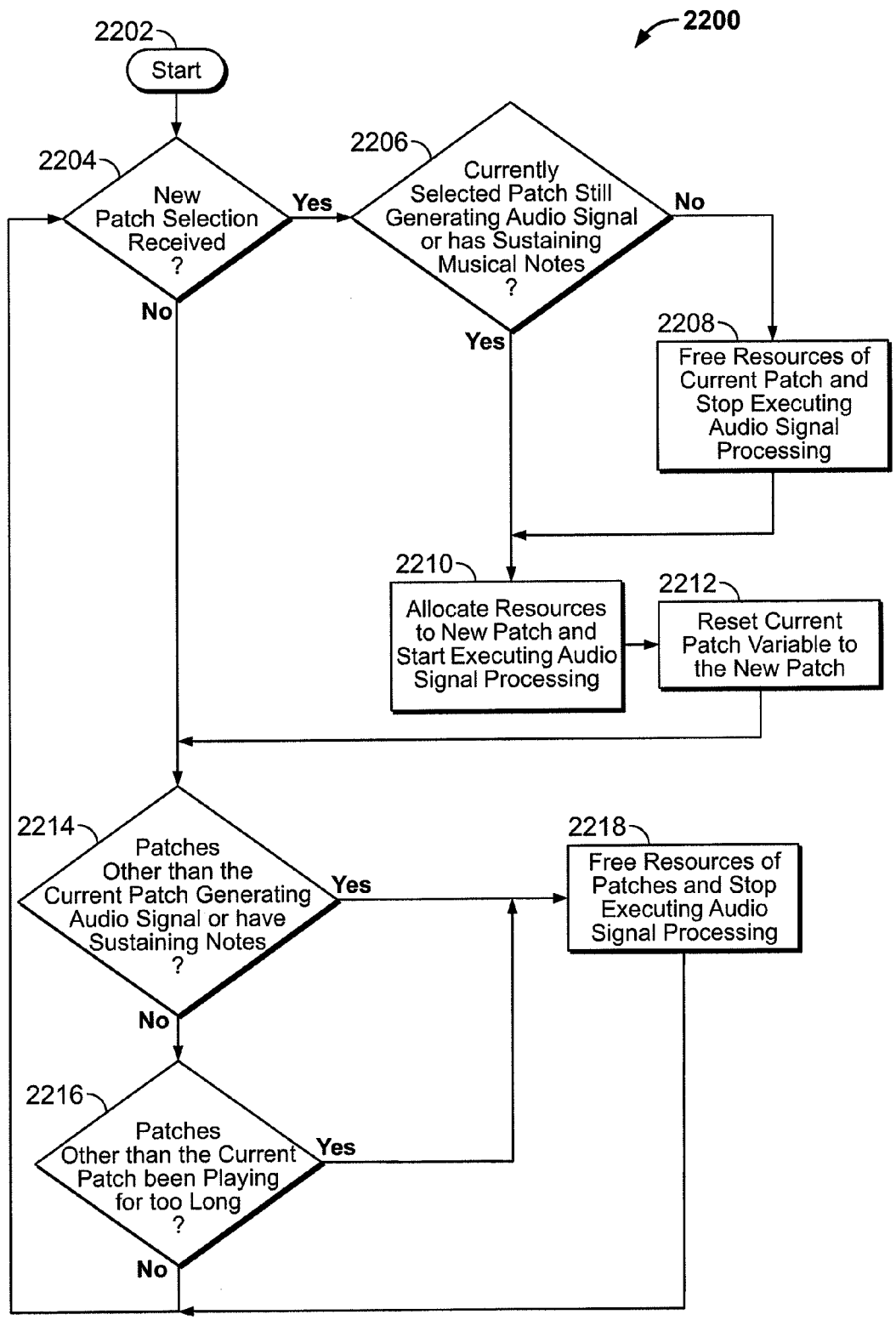
FIG. 22 is a flowchart of another illustrative process for maintaining a patch sound after another patch is selected in accordance with one embodiment of the invention.

FIG. 22 is a flowchart of another illustrative process for maintaining a patch sound after another patch is selected in accordance with one embodiment of the invention. Process 2200 may begin at step 2202. At step 2204, the media application may determine whether a new patch has been selected. For example, the media application may determine whether a user selection of a patch was received (e.g., using patch list 802, FIG. 8). If the media application determines that a new patch as been selected, process 2200 may move to step 2206. At step 2206, the media application may determine whether the currently selected patch (e.g., the patch selected prior to receiving the new patch selection at step 2204) still generates an audio signal or has sustaining musical notes. For example, the media application may determine whether any keys are held on a keyboard coupled to the media application.

If the media application determines that the currently selected patch still generates an audio signal or has sustaining musical notes, process 2200 may move to step 2208. At step 2208, the media application may free resources used by the current patch and stop executing audio signal processing. For example, the media application may re-allocate processor and memory resources away from the current patch. Process 2200 may then move to step 2210.

If, at step 2206, the media application instead determines that the currently selected patch no longer generates an audio signal and has no sustaining musical notes, process 2200 may move to step 2210. At step 2210, the media application may allocate resources to the new patch and start executing audio signal processing for the new patch. At step 2212, the media application may reset the current patch variable to the patch newly selected at step 2204. Process 2200 may then move to step 2214.

If, at step 2204, the media application instead determines that a new patch has not been selected, process 2200 may move to step 2214. At step 2214, the media application may determine whether patches other than the current patch (e.g., the patch selected prior to receiving the new patch selection at step 2204) are generating audio or have sustaining notes. For example, the media application may determine whether any keys are held on a keyboard coupled to the media application. If the media application determines that no patches other than the current patch are generating audio and no other patches have sustaining notes, process 2200 may move to step 2216. At step 2216, the media application may determine whether patches other than the current patch have been playing for too long. For example, the media application may determine whether patches other than the current patch have been playing for longer than timed-out patch maximum (e.g., 5 seconds). If the media application determines that no patches other than the current patch have been playing for too long, process 2200 may move back to step 2204 and continue to monitor user inputs for a new patch selection. If the media application instead determines that at least one patch other than the current patch has been playing for too long, process 2214 may move to step 2218.

If, at step 2214, the media application determines that patches other than the current patch are generating audio or have sustaining notes, process 2200 may move to step 2218. At step 2218, the media application may free resources used by the patches identified at step 2214 and stop executing audio signal processing for those patches. Process 2200 may then return to step 2204 and continue to monitor user inputs for a new patch selection.

The above described embodiments of the present invention are presented for purposes of illustration and not of limitation, and the present invention is limited only by the claims which follow.

What is claimed is:

1. A method for providing a graphical representation of an input in a media application, comprising:
    displaying at least two stacked layers wherein each layer is associated with a different sound;
    receiving a user input;
    determining the strength of the received user input; and
    changing the appearance of at least one layer of the at least two stacked layers based on the determined strength of the received user input.

2. The method of claim 1, wherein each of the at least two layers is associated with a range of strengths of user inputs.

3. The method of claim 2, further comprising:
    identifying the layer of the at least two layers associated with the range of strengths of user inputs that comprises the determined strength of the received user input; and
    changing the appearance of the identified layer.

4. The method of claim 1, wherein changing the appearance of at least one of the at least two stacked layers further comprises changing the color of the at least one of the at least two stacked layers.

5. The method of claim 1, wherein determining the strength of the received user input further comprises determining the velocity of the received user input.

6. The method of claim 5, wherein determining the velocity of the received user input further comprises extracting velocity data from data associated with the received user input.

7. The method of claim 6, wherein the user input comprises MIDI data.

8. The method of claim 1, further comprising providing an output using the sound associated with the at least one layer.

9. A method for providing a graphical representation of an input in a media application, comprising:
   defining a first layer associated with a first sound;
   defining a first input strength range associated with the first layer;
   defining a second layer associated with a second sound;
   defining a second input strength range associated with the second layer;
   displaying the first layer and the second layer;
   determining the input strength range of the input;
   providing an output using the sound associated with the layer that is associated with the determined input strength range; and
   changing the appearance of the layer that is associated with the determined input strength range.

10. The method of claim 9, wherein changing the appearance of the layer further comprises changing the color of the layer.

11. The method of claim 9, wherein changing the appearance of the layer further comprises changing the appearance of the layer based on the position of the strength of the received input within the determined input strength range.

12. The method of claim 9, further comprising:
   determining whether the strength of the received input exceeds the input strength range of at least one layer; and
   when the strength of the received input exceeds the input strength range of the at least one layer, changing the appearance of the at least one layer.

13. The method of claim 9, wherein the input strength of the input is the velocity of the input.

14. The method of claim 13, further comprising determining the velocity of the input based on velocity data received with the input.

15. The method of claim 13, further comprising determining the velocity of the input based on an indication of an amount of force used to provide the input.

16. A system for providing a visual response to an input using a media application, the system comprising:
   an input device;
   a display device; and
   a processor, the processor operative to:
      define a plurality of layers, wherein each layer is associated with an input strength range, and wherein each layer is associated with a different sound;
      display the plurality of layers on the display device;
      receive an input from the input device;
      identify the input strength range of the received input;
      identify the layer associated with the identified input strength range; and
      change the appearance of the identified layer.

17. The system of claim 16, wherein the processor is further operative to provide an output using at least the sound associated with the identified layer.

18. The system of claim 16, wherein the processor is further operative to:
   identify the strength of the received input; and
   identify the input strength range of the identified strength of the received input.

19. The system of claim 16, wherein each sound is defined by a channel strip.

20. A system for selectively providing a visual response to an input using a media application, the system comprising an input device, a display and a processor, the processor operative to:
   direct the display to display at least two layers, wherein each layer is associated with a particular sound, and wherein each layer is associated with an input velocity range;
   receive an input from the input device;
   determine that the velocity of the received input is in the input velocity range associated with a first layer of the at least two layers; and
   direct the display to modify the appearance of the first layer in response to receiving the input.

21. The system of claim 20, wherein the processor is further operative to:
   determine that the velocity of the received input exceeds the input velocity range of a second layer; and
   in response to determining that the velocity of the received input exceeds the input velocity range of the second layer, direct the display to modify the appearance of the first and second layer.

22. The system of claim 20, wherein the processor is further operative to direct the display to change the color of the first layer.

23. A method for selectively changing a visualization of an input received using a media application, the method comprising:
   defining a first channel strip, wherein the first channel strip is associated with a first input velocity range;
   defining a second channel strip, wherein the second channel strip is associated with a second input velocity range;
   receiving the input;
   determining that the input velocity of the received input is in the first input velocity range; and
   in response to determining that the input velocity of the received input is in the first input velocity range, providing an output using the first channel strip.

24. The method of claim 23, further comprising:
   displaying a first layer, wherein the first layer is associated with the first channel strip;
   displaying a second layer, wherein the second layer is associated with the second channel strip; and
   changing the appearance of the first layer in response to determining that the input velocity of the received input is in the first input velocity range.

25. The method of claim 24, wherein second layer is displayed above the first layer.

* * * * *